(12) United States Patent
Bogaerts et al.

(10) Patent No.: US 11,943,556 B2
(45) Date of Patent: Mar. 26, 2024

(54) HIGH DYNAMIC RANGE IMAGE SENSOR

(71) Applicant: GPIXEL NV, Antwerp (BE)

(72) Inventors: Jan Bogaerts, Sint-Katelijne-Waver (BE); Bram Wolfs, Nieuwrode (BE); Bart Ceulemans, Nijlen (BE)

(73) Assignee: GPIXEL NV, Antwerp (BE)

( * ) Notice: Subject to any disclaimer, the term of this patent is extended or adjusted under 35 U.S.C. 154(b) by 0 days.

(21) Appl. No.: 18/060,678

(22) Filed: Dec. 1, 2022

(65) Prior Publication Data
US 2023/0179891 A1 Jun. 8, 2023

(30) Foreign Application Priority Data

Dec. 2, 2021 (EP) ..................................... 21212076

(51) Int. Cl.
*H04N 25/772* (2023.01)
*H04N 25/531* (2023.01)
(Continued)

(52) U.S. Cl.
CPC ......... *H04N 25/772* (2023.01); *H04N 25/531* (2023.01); *H04N 25/58* (2023.01);
(Continued)

(58) Field of Classification Search
CPC .... H04N 25/772; H04N 25/531; H04N 25/58; H04N 25/616; H04N 25/771; H04N 25/79; H04N 25/583; H04N 25/587; H04N 25/59; H04N 25/78; H04N 25/581; H04N 23/73; H04N 23/741; H04N 23/76; H04N 23/80;
(Continued)

(56) References Cited

U.S. PATENT DOCUMENTS

| 8,582,010 B2 | 11/2013 | Cieslinski et al. |
| 9,521,351 B1 * | 12/2016 | Endsley ............... H04N 25/531 |

(Continued)

FOREIGN PATENT DOCUMENTS

WO     2015084991 A1     6/2015

OTHER PUBLICATIONS

Search Report from corresponding European Application No. 21212076.0, dated May 4, 2022.

*Primary Examiner* — Albert H Cutler
(74) *Attorney, Agent, or Firm* — Workman Nydegger

(57) ABSTRACT

A vertically stacked image sensor with HDR imaging functionality and a method of operating the same are disclosed. The image sensor comprises, a first substrate, a pixel array organized into a plurality of pixel subarrays, of which each pixel comprises a photoelectric element for integrating a photocharge during each one of a plurality of subframe exposures, a transfer gate and a buffered charge-voltage converter. A first charge accumulation element of the charge-voltage converter is operatively connectable to at least one second charge accumulation element through a gain switch. The image sensor comprises control circuitry configured to trigger a partial or a complete transfer of the and to time-interleave at least two rolling shutter control sequences. Separate readout blocks are provided on the second substrate for each pixel subarray, each comprising in a pipelined architecture an A/D conversion unit, a pixel memory logic and a pixel memory unit.

16 Claims, 16 Drawing Sheets

(51) Int. Cl.
*H04N 25/58* (2023.01)
*H04N 25/616* (2023.01)
*H04N 25/771* (2023.01)
*H04N 25/79* (2023.01)

(52) U.S. Cl.
CPC ......... *H04N 25/616* (2023.01); *H04N 25/771* (2023.01); *H04N 25/79* (2023.01)

(58) Field of Classification Search
CPC ........ H04N 25/00; H04N 25/50; H04N 25/51; H04N 25/53; H04N 25/57; H04N 25/578; H04N 25/76; H01L 27/14643; H01L 27/14601; H01L 27/14609; H01L 27/14612
See application file for complete search history.

(56) References Cited

U.S. PATENT DOCUMENTS

| | | | | |
|---|---|---|---|---|
| 10,103,193 | B1* | 10/2018 | Manabe | H01L 27/14689 |
| 10,313,613 | B2* | 6/2019 | Velichko | H01L 27/14609 |
| 11,343,450 | B1* | 5/2022 | Hasegawa | H04N 25/75 |
| 2006/0219866 | A1* | 10/2006 | Egawa | H04N 25/76 |
| | | | | 348/E3.018 |
| 2008/0258045 | A1* | 10/2008 | Oike | H04N 25/59 |
| | | | | 348/E3.018 |
| 2012/0127354 | A1 | 5/2012 | Cieslinksi | |
| 2014/0139715 | A1* | 5/2014 | Fukuoka | H04N 25/79 |
| | | | | 348/308 |
| 2016/0323524 | A1* | 11/2016 | Smith | H04N 23/741 |
| 2018/0115730 | A1 | 4/2018 | Velichko | |
| 2019/0222780 | A1* | 7/2019 | Chang | H04N 25/57 |
| 2023/0047180 | A1* | 2/2023 | Kodama | H04N 25/77 |
| 2023/0051657 | A1* | 2/2023 | Lloyd | H01L 27/14643 |

\* cited by examiner

HIGH DYNAMIC RANGE IMAGE SENSOR

FIELD OF THE INVENTION

The present invention relates to the field of image sensors and digital cameras with improved dynamic range. In particular, it relates to high dynamic range CMOS image sensors that use a stacked chip architecture.

BACKGROUND OF THE INVENTION

Image sensors and digital cameras with high dynamic range (HDR) imaging capabilities based on multiple subframe or multiple frame exposure techniques are known in the art. For instance, U.S. Pat. No. 8,582,010 B2 discloses an image sensor that is operated to repeatedly read out incomplete pixel signals during a single exposure procedure. The incomplete pixel signals are induced by respective partial transfers of the continuously generated photocharges in the pixels' light-sensitive element. However, the number of readout steps and the exposure duration in respect of each readout step are very limited for image sensors with a large number of pixels and limited bandwidth for data transfer off the sensor chip, because the rate at which pixel data to be transferred and processed is generated, increases rapidly with the number and the brevity of the readout steps, resulting in a data transfer bottleneck. Increasing the I/O bandwidth of the image sensor results in a sensor design that is more complex, cost- and energy-intensive.

US2012127354A1 (Cieslinski [DE]), 24 May 2012 discloses a CMOS image sensor for electronic cameras in which a column readout circuit associated with each column line of the sensor includes two parallel amplifiers that can be operated with different gain factors. In a high-dynamic range mode, the two amplifiers are associated with different readout channels of which the first readout channel is used to perform multiple partial intermediate readouts and the second channel to perform a final complete readout. Pixel signals obtained from multiple intermediate readouts can be stored on a corresponding number of signal stores connected before the amplifiers. A disadvantage of the image sensor is linked to the different readout paths that are used for high and low signal gain, which are more sensitive to artefacts such as cross-talk and banding. Moreover, the use of several amplifiers per column readout circuit is cost and area-intensive. Eventually, the effective frame rate drops for a given I/O bandwidth, when the sensor is operated in the HDR mode, and the full well capacity (FWC) of a sensor pixel is still limited by the FWC of the pixel's photodiode.

U.S. Ser. No. 10/103,193B1 (Manabe [US], et al.), 16 Oct. 2018 discloses a CMOS image sensor and imaging method according to which low dark currents are achieved. The method comprises repeated sampling of an image charge on the pixel photodiode, the sampled charge being transferred to a floating diffusion. While repeatedly sampling the image charge, an additional capacitance is coupled to the floating diffusion and a capacitance voltage applied to the additional capacitance. During image charge integration, the additional capacitance may be modulated, thereby reducing the dark current associated with the floating diffusion. The additional capacitance reduces the conversion gain, which is beneficial in high light intensity scenarios. Yet, no further increase of the dynamic range beyond that offered by the dual conversion gain can be achieved by this method.

WO2015084991 A1 discloses an integrated-circuit image sensor that is oversampled a first number of times within a first frame interval. A first output image can be constructed from a first number of image data frames corresponding to the first number of times of oversampling. Based on the first number of image data frames, an oversampling factor can be adjusted to oversample the pixel array a second number of times within a second frame interval. The readout operation relating to shorter oversampled subframes can be conditional, whereby the cumulative exposure time and the resulting dynamic range is increased. However, the verification circuitry and associated delay that is necessary to check whether the condition has been met increases the complexity of the image sensor and limits the speed at which the image sensor is operable.

It is desirable to improve the currently available HDR image sensors so that HDR imaging can be performed at higher speed and with less power consumption.

SUMMARY OF THE INVENTION

It is an object of embodiments of the present invention to provide an image sensor capable of acquiring image frames with high dynamic range and a related method of operating the image sensor. It is a further object of the present invention to provide an image sensor with improved faster internal readout and processing speed of pixel row data relative to a slower, external image frame transfer speed.

The above objective is accomplished by a method and device according to the present invention.

In one aspect, the invention relates to a vertically stacked image sensor device, which is provided as an integrated circuit. The stacked image sensor device comprises first substrate with a pixel array which is organized into a plurality of pixel subarrays. Each pixel of the pixel array comprises a photoelectric element, a transfer gate and a buffered charge-voltage converter. The photoelectric element, preferably implemented as a pinned photodiode, is adapted for integrating a photocharge while being exposed to light during each one of a plurality of subframe exposures comprised in a frame interval. The transfer gate is configured for transferring at least a fraction of the integrated photocharge present in the photoelectric element at the end of each subframe exposure to the buffered charge-voltage converter and the buffered charge-voltage converter is configured for receiving and converting the transferred photocharge to a voltage signal. This voltage signal, and optionally a reference voltage signal after resetting the pixel, constitutes pixel data to be read out. Furthermore, a first charge accumulation element of the charge-voltage converter is operatively connectable to at least one second charge accumulation element through a gain switch, allowing a conversion gain of the pixel to be switched between a high conversion gain and a low conversion gain. The image sensor device comprises control circuitry which is configured to trigger a partial or a complete transfer of the integrated photocharge in the photoelectric elements of each pixel row. The amplitude of a transfer pulse applicable to the transfer gate is adjustable through the control circuitry such that the partial transfer of the integrated photocharge is triggered for all but the last one of the plurality of subframe exposures and the complete transfer is triggered for the last one of the plurality of subframe exposure only. The control circuitry is also configured to interleave at least two rolling shutter control sequences, which are associated with at least two time-overlapping subframe exposures of the plurality of subframe exposures, in respect of each pixel subarray. Further, the control circuitry is configured to control the gain switches of each pixel row to operate the pixels at the low conversion gain for all but the last one of the plurality of subframe exposures and, for the last one of the plurality of subframe exposures, to first operate the pixels at the high conversion gain and subsequently at the low conversion gain. A second substrate of the image sensor device is vertically stacked and electrically interconnected with the first substrate and includes readout circuitry. The readout circuitry contains a separate readout block for each pixel subarray. Each readout block comprises, in a pipelined architecture, an A/D conversion unit for sampling and digitizing pixel row data of the corresponding pixel subarray, pixel memory logic for processing digital pixel row data and conditionally combining processed digital pixel row data with previously processed digital pixel row data buffered in a pixel memory unit, and a pixel memory unit for buffering processed digital pixel row data output by the pixel memory logic. The plurality of readout blocks is configured for parallel operation.

In embodiments of the invention, the rolling shutter control sequences preferably control the timing of reading out the pixel data at the end of each subframe exposure through the application of adequate reset signals, photocharge transfer pulses and row select signals to the pixels of an addressed row of pixels. Time-interleaving two or more rolling shutter control sequences ensures that the control signals (e.g., reset signals, photocharge transfer pulses and row select signals) are delivered to only one row of pixels of each pixel subarray at the time, while concurrently reading out the corresponding two or more subframes. Here, concurrent readout of two or more subframes refers to the situation where the readout of one subframe has not yet completed and is still ongoing at the time the readout of at least one next subframe starts.

Preferably, the control circuitry is provided on the second substrate, e.g., is formed on or in the second substrate. In less preferred but equally well operable embodiments, however, the control circuitry may be provided, in whole or in parts, on the first substrate. Providing the control circuitry on the second substrate has the advantage that a less complex and less costly fabrication process, e.g., requiring less lithography steps/masks, can be chosen for the first substrate, e.g. including active areas and transistors of only one doping type (e.g. p- or n-doping). Additionally, the time required to access pixel rows of the pixel subarrays for readout can be reduced if the control circuitry is provided on the second substrate, e.g. such that the pixel subarrays overlap row drivers of the control circuitry when viewed from the top and in the direction of substrate stacking, due to the shorter interconnect and wiring lengths and corresponding capacitances.

In embodiments of the invention, the second charge accumulation element may be part of the charge-voltage converter directly provided on the first substrate or may be provided as a separate gain circuit on the second substrate. Moreover, while embodiments of the invention are described with a preference for pixels with dual conversion gain, it is understood by those skilled in the art that the invention is also applicable to pixels with multiple (e.g. more than two) conversion gain factors, including pixels or pixel circuits that comprise more than two switchable charge accumulation elements or pixels or pixel circuits that comprise at least one variable capacitance, such as a voltage-controlled capacitance.

The parallel, pipelined chip architecture of the stacked image sensor allows the integration of on-chip pixel memory and pixel memory logic for the on-chip processing of read out pixel data at high internal speeds without affecting the external speed at which ready frames are transferred off the chip. This leads to substantial savings in the amount of data that has to be communicated via the I/O interface of the image sensor, as well as in the amount of data post-processing that has to be performed off-chip. As a result, less power is dissipated on the image sensor chip. Furthermore, multiple subframes can be combined already within the image sensor device to generate a final image frame with improved dynamic range. Owing to the dual conversion gain property of the image sensor pixels, subframe exposures can be obtained with a good signal-to-noise ratio under both low-light and bright-light illumination conditions. By only partially transferring photocharges generated under low-light conditions and by applying the low conversion gain during all but the last one subframe exposure, the noisier high gain channel can be applied only once, during the last subframe exposure. This leads to a substantial decrease in the total readout noise present in the summed subframe exposures.

Other application modes, not only limited to high dynamic range, can also be performed internally and benefit from the increased internal processing speed, while maintaining a lower external frame speed dictated by the image sensor's conventional I/O circuitry. Such other application modes may comprise a multiple subframe exposure mode in which all subframes are obtained with one and the same conversion gain and/or a multiple subframe exposure mode in which all subframes are acquired under complete photocharge transfer conditions. An image sensor device according to the invention may be operated in different application modes and the control circuitry of the image sensor reconfigured accordingly.

In accordance with some embodiments of the invention, the control circuitry may comprise multiple row drivers for driving the pixel rows of each pixel subarray, wherein at least two of said multiple row drivers are associated with each pixel row to drive different portions thereof. In particular embodiments, multiple row drivers may be associated with each pixel subarray and each one of the multiple row drivers corresponding to a respective one of the pixel subarrays is configured to drive only a subset of the pixels in each pixel row corresponding to that subarray. Preferably, the multiple row drivers correspond to a subdivision of a single row driver, e.g., a subdivision along the direction of increasing pixel column number in the subarray (column-wise grouping of pixels in each row such that each group is driven by one of the multiple drivers). Subdividing the row driver(s) has the benefit that the readout access time can be reduced compared to conventional row drivers that are exclusively arranged to the left/right of the pixel rows.

In accordance with some embodiments of the invention, a ratio between the subframe exposure rate and an output frame rate is at least two, e.g., equal or larger than two, e.g. equal or larger than four.

It is an advantage of embodiments of the invention that intermediate readings of the pixels only need to happen in the low conversion gain configuration of the pixels, which enables the use of only a single data memory location per pixel even for multiple (e.g., more than two) subframe exposures per full image frame.

It is a further advantage of embodiments of the invention that operating the image sensor device in the partial transfer mode, i.e. carrying out partial transfers of the integrated photocharge at the end of each but the last subframe exposure, relaxes the requirements on the uniformity of the potential barrier height across the pixels of the array, which, among other things, is influenced by the amplitude noise on the partial transfer pulses. As long as it is ensured that the amount of integrated photocharge left (i.e. not transferred) in each pixel after the sequence of partial photocharge transfers is sufficient to cover the signal range in the high conversion gain channel of the pixel at the end of the last subframe exposure—a much less stringent requirement to meet—the non-uniformity of potential barriers across the pixels of the array is no longer a concern. The reason for this is that the pixel readings are performed with the low conversion gain once the amount of integrated photocharge, fully transferred at the end of the final subframe exposure, causes the signal range in the high conversion gain channel of the pixel to be exceeded. In pixel readings in the low conversion gain channel, all integrated photocharges, partially and fully transferred, can be advantageously summed over the set of subframe exposures and with respect to the same pixel gain configuration (e.g., combination of interconnected first and second charge accumulation elements). Hence, any non-uniformity due to the partial transfer operation does not impact the final outputs obtained in respect of the low gain channels either.

It is an advantage of embodiments of the invention that the read noise for multiple subframe exposures is not increased, whereby higher dynamic range (DR) is achieved.

It is an advantage of embodiments of the invention that a DR of 80 dB or more can be obtained. For instance, a DR of 100 dB or more, e.g., 120 dB or more, for instance between 80 dB and 150 dB, such as between 80 dB and 120 dB, may be obtained using two or more subframe exposures.

It is an advantage of embodiments of the invention that HDR imaging can be performed at high speed, e.g., higher speed than is currently the case, and with limited power being consumed, e.g. less power than is currently the case. In conventional image sensors an increase in the imaging speed is accompanied by higher bandwidth requirements, and thus an increased power consumption. A higher power consumption generally means that either more cooling is needed, resulting in a bigger camera, or the operating temperature increases, which often has a negative impact on the image sensor performance (e.g., higher dark currents). Therefore, embodiments of the invention have the additional advantages that image frame data is transferred at a slower I/O bandwidth, compared to the higher internal bandwidth available for pixel data readout and internal processing of pixel data, which keeps the power consumption with respect to the image frame data transfer off-chip low. This allows for the design of small and compact camera modules and a reduction in the dark current levels.

In another aspect, the invention relates to a method of operating an integrated circuit image sensor. The image sensor comprises a pixel array that is disposed in a pixel substrate and organized into a plurality of pixel subarrays. The method comprises integrating a photocharge in the pixels of the pixel array during each one of a plurality of subframe exposures comprised in a frame interval, and partially transferring the integrated photocharges of the pixels to respective charge-voltage converters of the pixels at the end of all but the last subframe exposure. The charge-voltage converters are configured to apply a low conversion gain when reading out the partially transferred photocharges at the end of all but the last subframe exposure. At the end of the last subframe exposure, the integrated photocharges of the pixels are completely transferred to the respective charge-voltage converters of the pixels and the charge-voltage converters are configured to first apply a high conversion gain when reading out the completely transferred photocharges, thereby providing a high gain channel during readout, and immediately thereafter a low conversion gain, thereby providing a low gain channel during readout. The pixel row data of each subarray is being read out sequentially at the end of each subframe exposure and includes the pipelined steps of sampling and digitizing the pixel row data, conditionally combining digitized pixel row data with previously digitized pixel row data buffered in a pixel memory unit of the readout block, and buffering digitized pixel row data in the pixel memory unit of the readout block. In accordance with the invention, pixel row data stemming from different pixel subarrays is being read out in parallel and, for each pixel subarray, at least two subframe exposures of the plurality of subframe exposures are overlapping in time and rolling shutter control sequences associated with said at least two subframes exposures are being time-interleaved.

In some embodiments of the invention, two or more image frames, each composed of multiple subframes, may be merged or combined into a single output frame, wherein the method steps are applied separately to each one of the two or more image frames, e.g., in sequence. The merging or combining may be carried out externally, i.e., off-chip.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
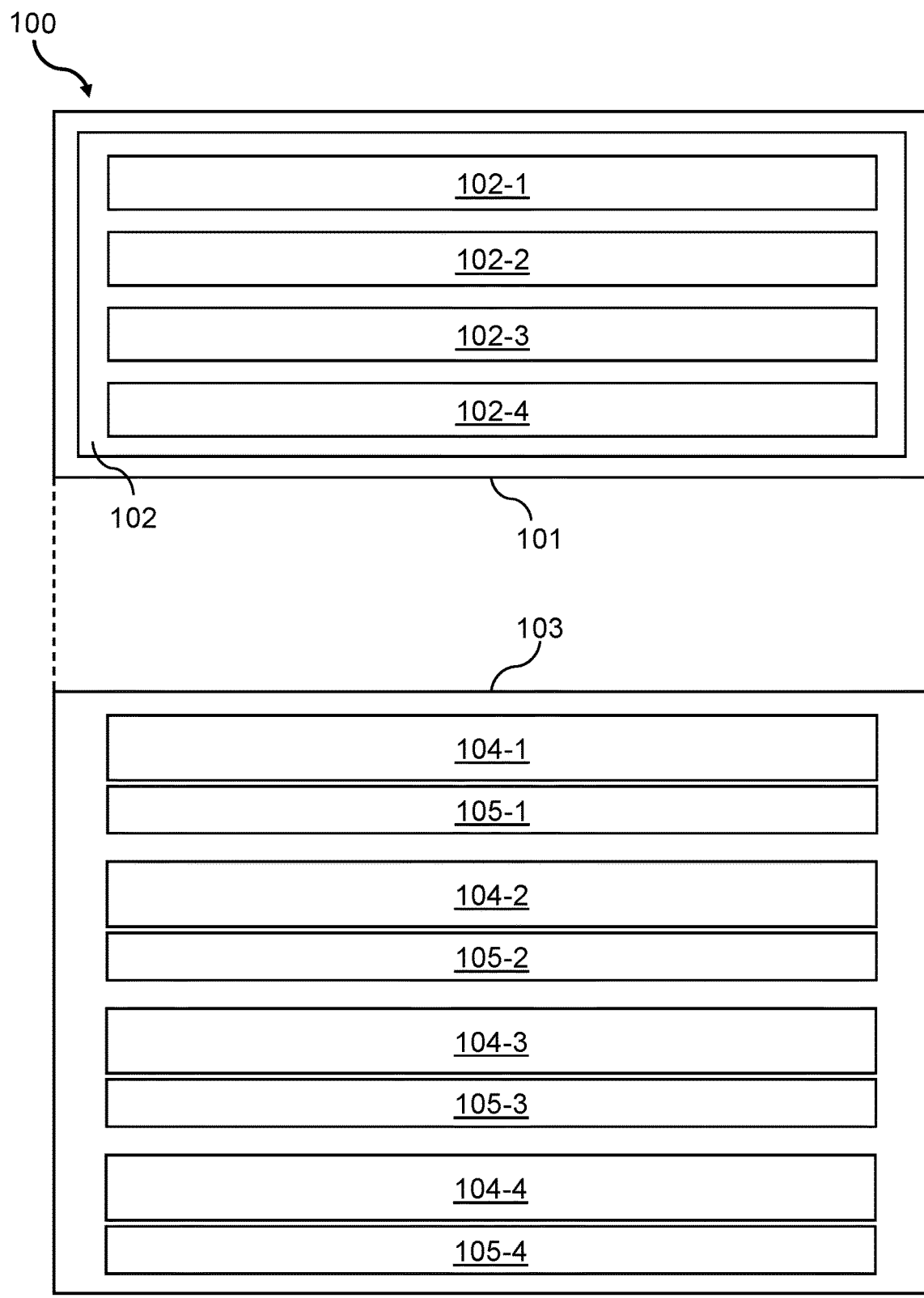
FIG. 1 is a schematic per-layer view of a stacked image sensor with extended dynamic range capabilities in accordance with embodiments of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

Directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Furthermore, while some embodiments described herein include some, but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, a photocharge that is integrated by a photosensitive element, such as a photodiode, upon illumination is understood as a definite amount of electrical charge, which may be expressed in terms of a fundamental charge, for instance as a plurality of photo-generated electrons.

In a first aspect, the present invention relates to a stacked image sensor, for instance a vertically stacked CMOS image sensor, which provides image or video frame acquisition at increased dynamic range and also increased internal data readout and processing rates relative to an external readout speed of the device, i.e. the speed at which units of data (row or full frame) are transferred off the image sensor chip. If a conventional image sensor device runs at its maximum external frame rate, it also runs at its lowest internal row time—the time necessary to address a row of pixels, read out the addressed row of pixels, perform analog-to-digital conversion (A/D conversion) of the read out pixel data and transfer a complete row of pixel data off the chip (external readout). In a stacked image sensor according to the invention, running at the maximum external frame rate does not stand in the way of implementing pixel row readout operations, as well as further data processing operations using the read out pixel data, internally at a much higher speed. An exemplary way of exploiting the faster running internal pixel row readout and pixel data processing operations in embodiments of the invention is to operate the image sensor device in a dual or multiple subframe exposure mode, in which pixel row data relating to the multiple subframe exposures is combined into a high dynamic range (HDR) image frame.

FIG. 1 shows a stacked image sensor 100 as a layered structure in which an upper first substrate 101 is vertically stacked onto a lower second substrate 103. The first substrate 101 of the image sensor 100 comprises an array of pixels 102 and can be configured to work under front-illumination conditions or back-illumination conditions. The pixel array 102 is organized into a plurality of pixel subarrays 102-1 to 102-4, for instance by vertically dividing the pixel array into independently addressable blocks of pixel rows, wherein each block contains a plurality of consecutive pixel rows of the pixel array. Blocks of contiguous pixel rows are only one specific example of dividing the pixel array 102 into a set of pixel subarrays. Other ways of assigning individual pixel rows of the pixel array to one of the pixel subarrays exist, for example a random assignment of the individual pixel rows to one of the plurality of subarrays or an interleaved assignment according to which contiguous pixel rows of the pixel array are assigned to different pixel subarrays, e.g. i-th pixel row being allocated to the n-th pixel subarray out of N pixel subarrays, where n=(i mod N). An interleaved assignment of pixel rows to a set of pixel subarrays, and the resulting interleaved connection of pixel rows to different readout blocks, may have the additional advantage of preserving a uniform rolling shutter effect over the whole pixel array.

The second substrate 103 contains control and readout circuitry for selecting, controlling, and reading out pixel rows of the pixel array, as well as for processing the read out pixel data from the pixel rows of the array. The readout circuitry is organized into a plurality of blocks 104-1 to 104-4, referred to as readout blocks, which correspond in number to the pixel subarrays. More specifically, each readout block is matched with and electrically connected to exactly one of the pixel subarrays. The electrical connections between pixel subarrays and readout blocks may be fixed connections, which are easier to implement, or reconfigurable connections, which provide more flexibility, e.g. reconfiguration of the way pixel subarrays are connected to the readout blocks in case of vertical and/or horizontal windowing is applied to the pixel array of the image sensor, to optimize imaging speed. This association between pixel subarrays and readout blocks enables parallel control of each pixel subarray, concurrent readout of k different pixel rows associated with k different pixel subarrays and also parallel processing of the read out pixel row data. A typical number k of pixel subarrays and corresponding readout blocks may be k=2, . . . , 8, 16, . . . , 128. More than one pixel row being read out at the same time, the image sensor is configured for parallel operation. As explained in more detail hereinbelow, readout operations and data processing operations performed on the read out pixel row data are pipelined in respect of each pixel subarray-readout block pair.

By way of example, the image sensor may comprise 16 readout blocks and a pixel array with several thousands of pixel rows, e.g., 6 k pixel rows, in which two vertically adjacent pixels are shared (i.e., 2×1 vertical sharing). During a first row time, the first readout block reads the pixel data of row 0, the second readout block reads the pixel data of row 2, the third readout block reads the pixel data of row 4, etc. Next, during a second row time, the first readout block reads the pixel data of row 1, the second readout block reads the pixel data of row 3, the third readout block reads the pixel data of row 5, etc. During a third row time, the first readout block reads the pixel data of row 32, the second readout block reads the pixel data of row 34, the third readout block reads the pixel data of row 36, etc. and, during a fourth row time, the first readout block reads the pixel data of row 33, the second readout block reads the pixel data of row 35, the third readout block reads the pixel data of row 37, etc. This process continues until the last pixel row of the pixel array has been read out.

The control circuitry preferably comprises a plurality of row drivers 105-1 to 105-4, matched in number with the plurality of readout blocks 104-1 to 104-4, and control logic (not shown) for controlling the plurality of row drivers, e.g. controlling the sequencing of row control signals (e.g. row select control signal, reset control signal, charge transfer gate control signal) driven by the row drivers. Owing to the vertical stacking of the two substrates 101 and 103, row drivers 105-1 to 105-4 may be located on the second substrate 103 and mainly extend in a (pixel) row parallel direction x, i.e. in the direction of increasing pixel column numbers, as shown in FIG. 1, so that they are underneath the pixel array and overlapped by pixel rows of the pixel array when viewed from the top of the image sensor (e.g. illumination side).

Alternatively, the row drivers may be located on the second substrate 103 and mainly extend in a direction of increasing (pixel) row numbers y so that they are to the left and/or right of the pixel rows and substantially free of overlap by pixel rows of the pixel array when viewed from the top of the image sensor. In yet alternative embodiments of the invention, the row drivers may be located on the first substrate 101, e.g., to the left and/or right of the pixel rows. Providing the row drivers of the second substrate has the advantage that row addressing noise, which can interfere with the pixel signals, can be reduced and further that a larger surface area of the first substrate is available for imaging.

Although shown as individual blocks in FIG. 1, one or more (e.g., all) row drivers 105-1 to 105-4 may be further subdivided in the x-direction, meaning that multiple row drivers are used to drive a single pixel row. Such a subdivision has the benefit that the readout access time can be reduced (reduction of RC time constant) compared to conventional row drivers that are exclusively arranged to the left/right of the pixel rows. The second substrate 103 may also comprise additional circuitry, such as serialization circuitry and I/O drivers, configured for generating and outputting a data stream relating to an image frame.

Vertical stacking of the first and second substrate 101, 102 can be achieved by die-to-die bonding, or die-to-wafer or wafer-to-wafer bonding with subsequent wafer dicing. The first and second substrate are electrically interconnected, e.g. via through silicon vias (TSVs) or direct or hybrid bonding techniques (e.g. copper-to-copper interconnects), such that a set of pixel row data signals, relating to a plurality of pixel rows located in respective pixel subarrays of the first substrate, is read out concurrently by the corresponding set of readout blocks in the second substrate. Each pixel row data signal is transferred on column bit lines from the first substrate to the second substrate, wherein column bit lines are understood as extending through the interconnect layer between the first and second substrate.

Figure 2:
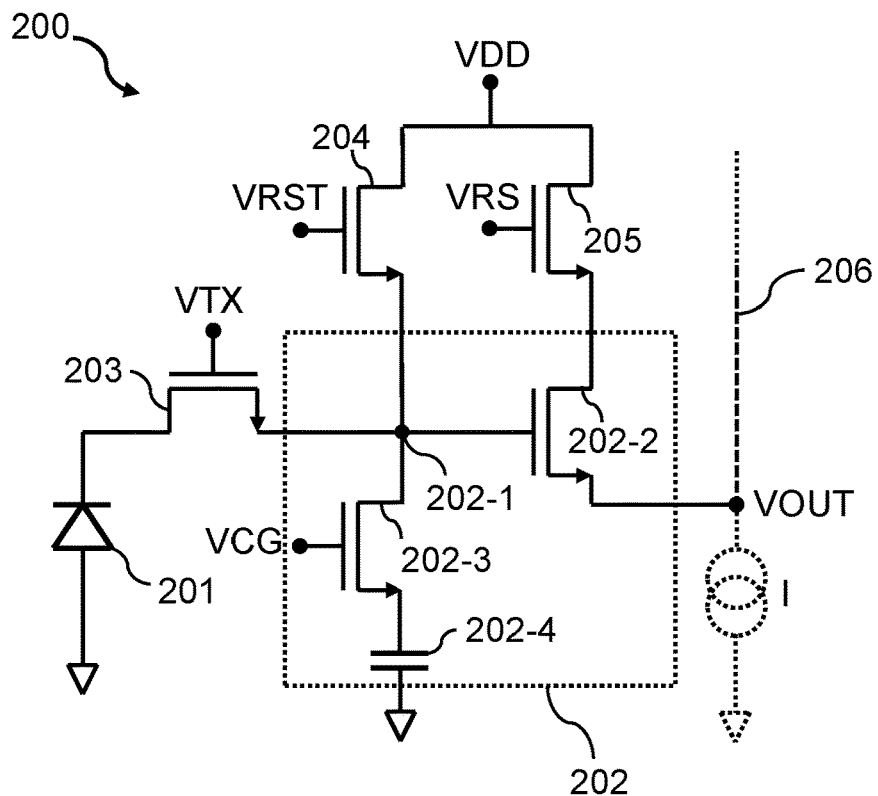
FIG. 2 is a circuit diagram of a pixel with dual conversion gain, which can be used in embodiments of the invention.

FIG. 2 shows a possible circuit architecture of an active pixel that is configured to have two different charge-to-voltage conversion gains, hereinafter referred to as dual gain pixel or dual conversion gain pixel. The pixel 200 comprises a photoelectric element 201, preferably a pinned photodiode, a buffered charge-voltage converter 202, and a transfer gate 203 connected between the photoelectric element and the charge-voltage converter. The buffered charge-voltage converter includes a floating diffusion node 202-1 as a first charge accumulation element of the charge-voltage converter, a source-follower transistor 202-2 having a gate terminal electrically connected to the floating diffusion node 202-1, and a combination of gain switch 202-3 and gain capacitance 202-4 as a second charge accumulation element of the charge-voltage converter.

The pixel 200 further includes a reset transistor 204, connected between positive voltage supply VDD and the floating diffusion node 202-1, for resetting the floating diffusion node to a predetermined voltage level close to VDD each time the reset transistor is switched on by a corresponding reset control signal VRST, thereby erasing the previously stored pixel data on the floating diffusion node. Furthermore, the source-follower transistor 202-2 is controllably connectable to a bit line 206 via a row select control signal VRS that is applicable to the gate of a row selection transistor 205 of the pixel. Although the row selection transistor 205 is connected between the source-follower transistor and voltage supply VDD in FIG. 2, it is understood by those skilled in the art that different arrangements of the row selection transistor are possible, for example arrangements in which the row selection transistor is connected between the source-follower transistor 202-2 and VOUT on bit line 206.

When the pixel 200 is illuminated, the photoelectric element 201 starts integrating a photocharge which is generated in response to the received amount of irradiation. The integrated photocharge, or at least a portion thereof, is transferred to the floating diffusion node 202-1 of the buffered charge-to-voltage converter 202 upon activation of the transfer gate 203 by a suitable charge transfer control signal VTX, i.e., a transfer pulse. Control circuitry of the image sensor (not part of the pixel circuitry) sets an amplitude, e.g. voltage amplitude, of the transfer pulse such that either a partial transfer of the generated photocharge to the floating diffusion node, or floating diffusion node and connected gain capacitance, is triggered or a complete transfer the generated photocharge to the floating diffusion, or floating diffusion node and connected gain capacitance, takes place. In general, a higher amplitude of the transfer pulse leads to a more pronounced decrease of the potential barrier separating the charge well associated with the photoelectric element and the charge well associated with the floating diffusion node (with or without the connected gain capacitance) and therefore causes more photocharge carriers to be transferred away from the photoelectric element. The capacitance associated with the floating diffusion node allows temporary storage of the transferred photocharge and converts the deposited photocharge into a voltage signal that is sensed by the source-follower transistor 202-2. When the row select transistor 205 is switched on, i.e., when the pixel is selected for readout, a current set by an external current source starts to flow on the corresponding bit line 206 and through the row select and the source follower transistor. The voltage VOUT at the source terminal of the source-follower transistor is directly following the voltage signal applied to its gate terminal. If the gain switch 202-3 is open (e.g., low voltage at VCG), a first charge-to-voltage conversion gain is determined by the capacitance value of the floating diffusion node. If the gain switch 202-3 is toggled into a closed state (e.g., high voltage at VCG), then a portion of the photocharge originally stored at the floating diffusion node is flowing onto the additional gain capacitance 202-4. The additional gain capacitance and the floating diffusion node capacitance are now connected in parallel, resulting in a larger overall capacitance available for the storage of the transferred photocharge. This in turn leads to a drop of the voltage signal that is sensed at the gate terminal of the source-follower transistor and directly translates into a lower, second charge-to-voltage conversion gain. In an alternative embodiment, the additional gain capacitance can also be connected to positive voltage supply instead of ground, or the additional gain capacitance may correspond to the floating diffusion node of a neighboring pixel. In the latter alternative, the pixels are thus configured to dynamically share their floating diffusion nodes with at least one neighboring pixel of a different row, wherein the shared floating diffusion node of a pixel is temporarily connected to the neighboring pixel and acts as the additional gain capacitance. This has the advantage that a more compact design can be obtained, which does not require a separate pixel component for the gain capacitance.

Row control circuitry of the image sensor, of which the pixel 200 forms part, is configured to control the gain switch 202-3 via a dedicated conversion gain control signal VCG applicable to the control terminal of that gain switch. The pixel 200 can thus be controlled to apply a first or a second charge-to-voltage conversion gain with respect to the integrated photocharge during readout. The charge-to-voltage converter is buffered, because the readout is non-destructive, i.e., the transferred and stored photocharge is not destroyed or altered by the readout action.

Figure 3:
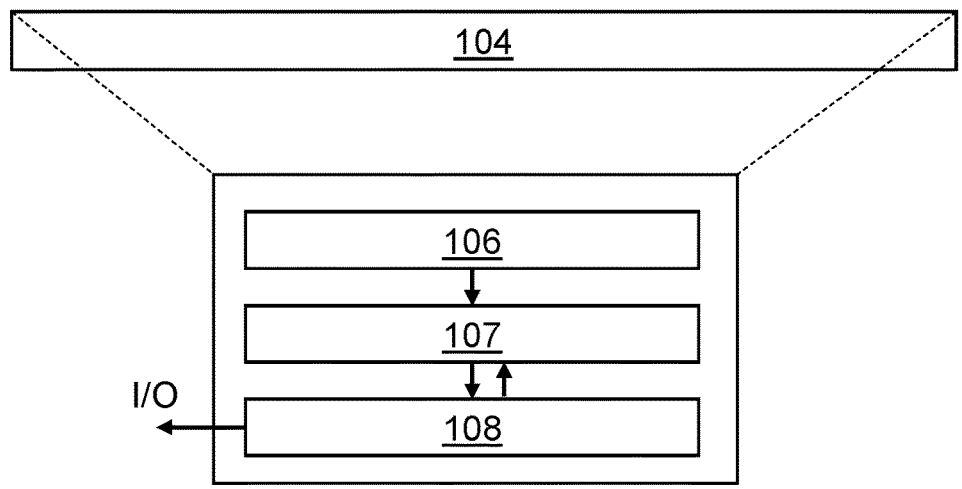
FIG. 3 illustrates the circuit components that compose a readout block as used in embodiments of the invention.

FIG. 3 illustrates the different circuit components composing each readout block 104 of the second substrate, while the plurality of readout blocks is configured for parallel operation. Every readout block 104 comprises at least one analog-to-digital conversion unit 106 for sampling and digitizing pixel row data of the corresponding pixel subarray, pixel memory logic 107 for processing samples of the digitized pixel row data, and a pixel memory unit 108 for buffering the processed samples of digital pixel row data which are output by the pixel memory logic 107. The dataflow between the components, or the components and peripheral I/O circuitry, is indicated by arrows. In particular, intermediate pixel row data stored in the pixel memory unit 108 can be accessed by the pixel memory logic (PML) 107 in order to conditionally combine the currently processed sample of digital pixel row data with a previously processed sample of digital pixel row data that has been buffered in the pixel memory unit 108. Such a combination of two processed samples of digital pixel row data can then be written back to the pixel memory unit 108, from which it is either accessed by the peripheral I/O circuitry, e.g. in cases where the buffered combination of processed samples of digital pixel row data constitutes the final sample to be transferred off the imager sensor chip, or is again accessed by the PML, e.g. in cases where the buffered combination of processed samples of digital pixel row data constitutes an intermediate result not yet ready for output. In the latter case, the PML may use the retrieved, intermediate combination of processed samples of digital pixel row data and the currently processed sample of digital pixel row data to calculate an updated or final combination of processed samples of digital pixel row data. In embodiments of the invention, the PML may combine two or more samples of digital pixel row data by adding or subtracting the samples. Moreover, processing operations performed by the PML on a sample of digital pixel row data may include scaling a sample of digital pixel row data, e.g. prior to combining it with another sample, pixel-wise comparing a sample of digital pixel row data to a threshold value, computing a change of representation for the sample of digital pixel row data (e.g. from Gray code to binary), or combinations thereof. The processing functionality of the PML is not limited to the given examples and may be extended to perform additional processing operations on the obtained samples of digital pixel row data, which may depend on particular applications or mode of operations for the image sensor.

Although embodiments of the invention are not restricted to readout blocks without an analog column bit line signal amplification stage, which can be a part of the A/D conversion unit, it is preferable to directly obtain digital samples of the pixel data in a selected row of pixels by directly connecting an A/D converter to the column bit lines, without any intervening amplifier. This has the advantage of reducing the conversion time and allows to obtain shorter unit time slots, which in turn enable an increased number of subframe exposures to be taken within a single full frame period. It is also possible to further reduce the time due to conversion by reducing the bit resolution of the A/D converters (ADC) in the conversion unit, at the cost of reading out less accurate pixel data. Typical embodiments of the invention implement ADCs with 12 bit resolution. In terms of readout speed and given the goal of achieving multiple subframe exposures in a single full frame period, fast ADCs are preferable, e.g., SAR-ADCs if the efficient use of silicon area is not critical. However, embodiments may also use other ADC types, e.g., single-sloped ADCs if a more energy-efficient and/or area-efficient implementation is striven for, e.g. in embodiments which implement per-pixel-ADCs. Ramp-based ADC architectures, e.g., including single-sloped ADCs, have a simple layout and, compared to other ADC architectures, use a smaller design area per pixel column. They are preferred in embodiments of the invention in which bit resolution can be traded for speed of operation, e.g. via the number of clock cycles for the ADC counters, whereby a flexible and dynamic adjustment of the bit resolution per subframe (e.g. 12.7 bits, not necessarily integers) and hence of the number of subframe exposures to be accommodated in a full frame period of the image sensor is obtainable.

The pixel memory units of all readout blocks act as a global frame buffer. In particular embodiments of the invention, this global buffer has a data buffering capacity that is smaller than the size of a full image frame, e.g., can only hold a portion of a full image frame as generated by the image sensor. This is possible, for instance, if pixel row data is retrieved fast enough from the global buffer for off-chip transfer such that buffer overflow is prevented. It is then allowed to map different pixel rows to a same location in the pixel memory unit without losing the pixel row data. The intermediate storage of pixel row data in the pixel memory units typically is on time intervals larger than the combined time for selecting the row of pixels and converting the pixel data of the selected row in the A/D conversion unit but less than a full frame period. Preferably, the pixel memory units 108 on the second substrate of the image sensor chip are provided as blocks of SRAM unit cells, e.g., used as a memory bank of a banked SRAM memory. The memory units on the second substrate, e.g., the SRAM memory units, are preferably managed independently from each other on a per-readout block level. The memory unit corresponding to each readout block may be subdivided into even smaller memory subunits, e.g., similar to the subdivision of the row drivers. Per-readout block level managed pixel memory units, or subdivisions thereof, are advantageous in view of their smaller physical size and address space, which makes read/write operations to the pixel memory units faster. It may also prove useful for yield reason, e.g., the memory unit corresponding to each readout block could be built with some redundancy so as to allow the independent handling of memory defects.

Figure 4A:
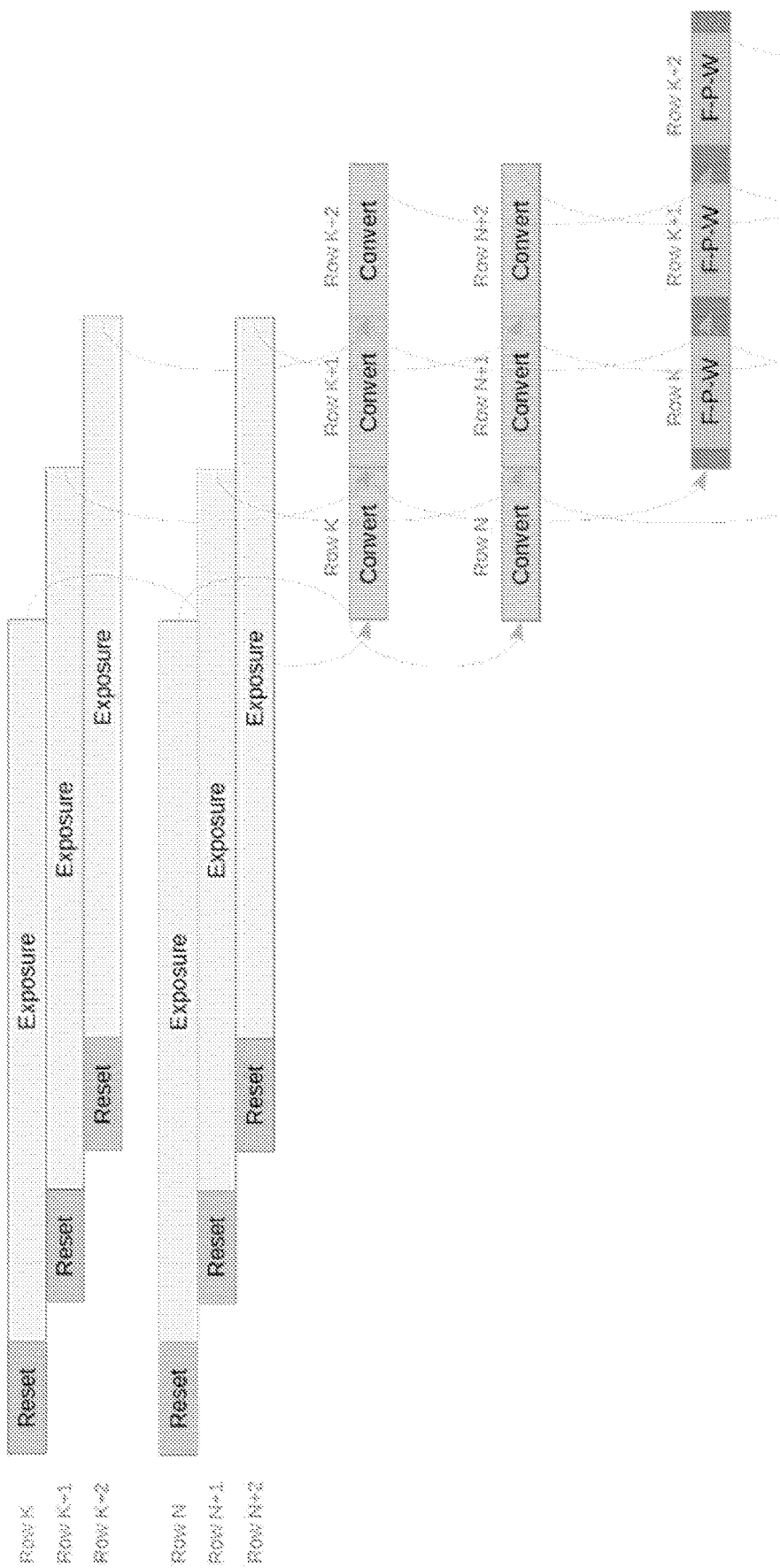
FIG. 4A-B and FIG. 5 are timing diagrams illustrating the parallel and pipelined readout architecture of an image sensor according to the invention.
Figure 4B:
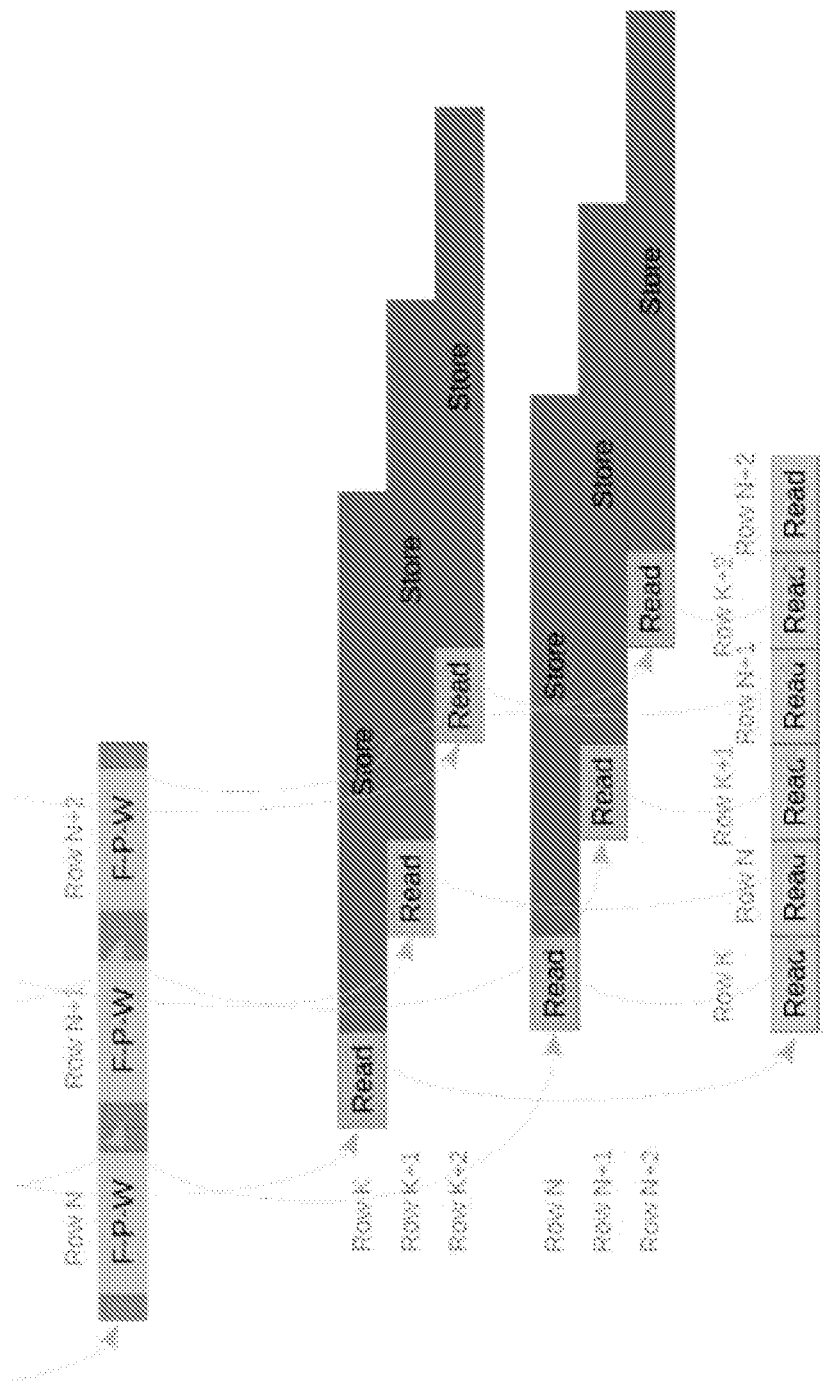

FIG. 4 is a flow diagram which illustrates the parallelized pipelined architecture of the stacked image sensor during image or video acquisition. Pipelining encompasses the following stages related to each pixel row of the image sensor: pixel row reset, pixel row exposure, pixel row data readout and analog-to-digital conversion, a complete fetch-process-write (F-P-W) cycle performed on the digitized pixel row data by the pixel memory logic (PML), write-back of the digitally processed pixel row data to the pixel memory unit for intermediate storage, and access to the pixel memory to produce a global I/O stream of pixel row data when transferring one frame (or consecutive frames) of processed image data off the sensor chip. As described above, the digital processing applied by the PML may comprise the conditional combining of two samples of digital pixel row data, e.g., if the current sample of digital pixel row data supplied by the A/D conversion unit satisfies a predetermined or programmable condition, e.g. surpassing a threshold value. In such cases, the current sample of digital pixel row data supplied by the A/D conversion unit and a previously obtained sample of digital pixel row data buffered in the pixel memory unit are loaded into the PML during the prefetch cycle and the combination of the two samples (e.g. sample addition and, optionally, a subsequent compression of the sum) is performed during the process cycle of the PML. The result of the processing operation is then written back to the pixel memory unit during the write cycle of the PML.

For example, in the operating mode that uses partial transfers of the integrated photocharge for all but the last one subframe exposure (partial transfer mode), the pixel readings from the low gain channel are combined (e.g., cumulative sum) under the condition that the pixel readings to be added are not relating to the last subframe exposure. The intermediate partial sums are stored in the pixel memory unit. The low gain pixel reading from the last subframe exposure is only added to the partial sum if the condition of the corresponding high gain pixel reading surpassing a threshold is fulfilled. Then the updated partial sum becomes the final sum and is used as an output of the image sensor device. If the corresponding high gain pixel reading does not surpass the threshold, then only the high gain pixel reading is used as an output. Alternatively, if compression is enabled (e.g. operating the image sensor device in the partial transfer mode with compression), then an output in compressed format is obtained as a combination (e.g. applied compression algorithm) of the high gain pixel reading and the preceding partial sum of all the low gain pixel readings (i.e. pertaining to all but the last one subframe exposure). The compressed output data can be sent immediately off-chip and, therefore, does not need to be written back into the pixel memory unit.

As a further example, if the image sensor device is operated in the full transfer mode, i.e. transferring the integrated photocharge in full at the end of each subframe exposure, then the pixel readings in the low gain channel and the high gain channel are summed separately over the number of subframe exposures (e.g. by updating independent partial sums for the low gain and high gain channel respectively). If compression is enabled in this operating mode, e.g., full transfer mode with compression, then the partial sums for the low gain channel and the high gain channel can be input to a compression algorithm at the end of each subframe exposure and only the compressed partial sum needs to be written back to the pixel memory unit. This has the advantage of lowering storage requirements but necessitates additional computation for the decompression during readback.

FIG. 4 further illustrates that pipelining is applied to the sequence of pixel rows contained in one pixel subarray, whereas different pipelines work in parallel in respect of different pixel subarrays. In other words, a separate pipeline is implemented for each pixel subarray and corresponding readout block, yielding K-way pixel row data acquisition and processing for a total of K independent pixel subarray/readout block combinations. For the purpose of streaming the processed frame data off the image sensor chip, the accesses to pixel memory are time-interleaved so that pixel row data pertaining to different pixel subarrays do not overlap. The electronic rolling shutter of the image sensor works well in conjunction with the fully pipelined architecture as the (partial) exposure of pixel rows and the reading out of pixel row data after (partial) exposure is carried out sequentially.

For the sake of clarity, the flow diagram of FIG. 4 includes only two pixel subarray, comprising three pixel rows each. In typical embodiments of the invention, there can be more than two readout blocks and pixel subarrays present, e.g., between two and sixteen, and each pixel subarray typically contains hundreds of pixel rows.

Figure 5:
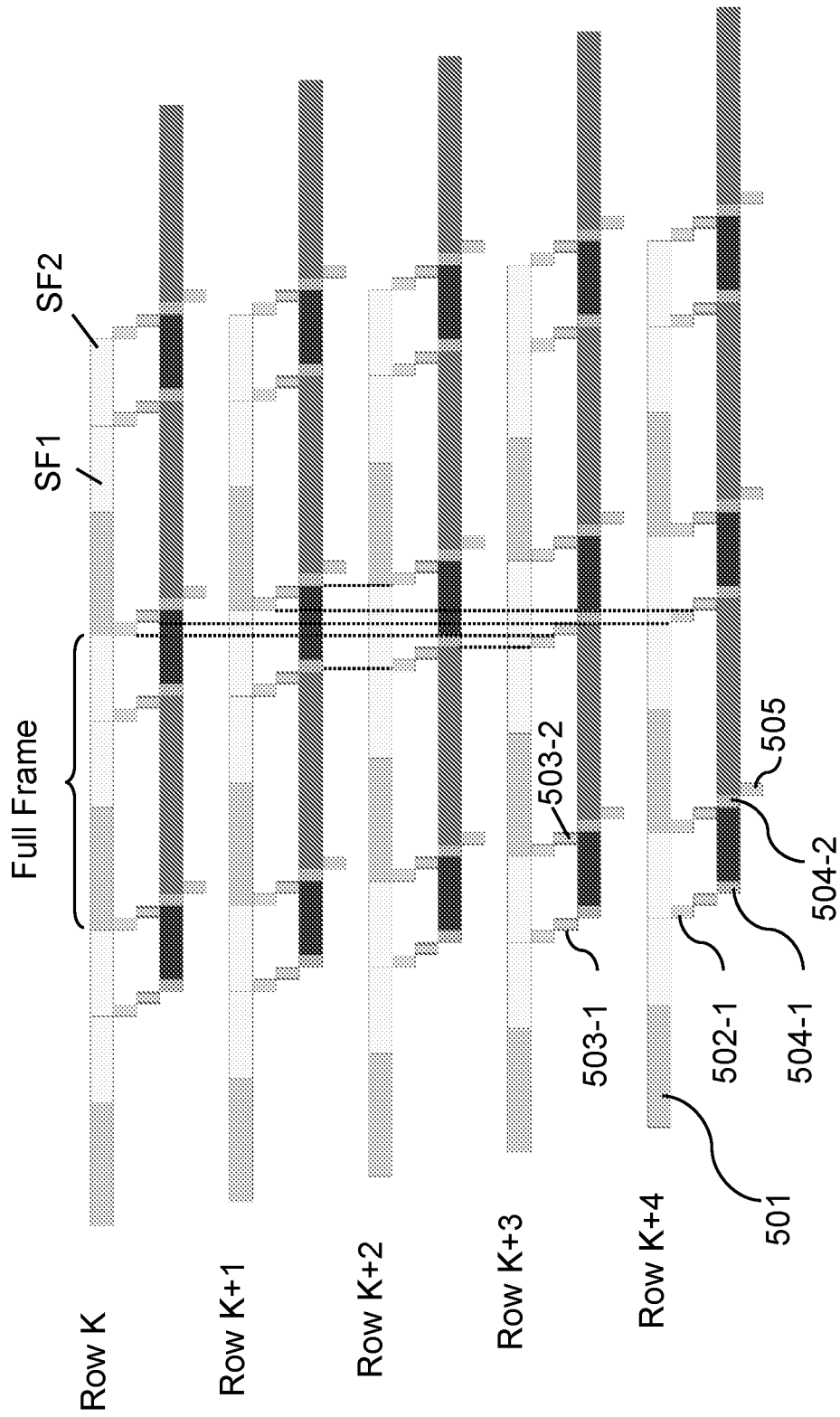

FIG. 5 is a flow diagram that illustrates the pipelining of pixel row data in the case of multiple subframe exposures, in this example two subframe exposures SF1 and SF2 that are of equal sub-exposure time and contiguous in time. Contiguity in time is beneficial for reduced rolling shutter distortions in the final images. For the sake of clarity, FIG. 5 only shows the data pipelining for a single pixel subarray and corresponding readout block; as mentioned earlier in this application, embodiments of the invention provide for multiple, parallelly working pipelines with regard to the plurality of pixel subarrays and corresponding readout blocks. Embodiments of the invention are also not limited to two subframe exposures—for instance, three, four, or more than four subframe exposures may compose a full frame—and subframe exposures do not have to be equal in duration. Subframe exposures do not have to be contiguous in time, provided that the image sensor is operated in a mode that does not use partially transferred photocharges.

After termination of the first subframe exposure SF1, pixel data of each row K, K+1, . . . , K+4 is read out and converted into digital pixel row data in step 502-1, processed by the PML in step 503-1 and written to pixel memory unit in step 504-1. At this point, the processed pixel row data is stored in the pixel memory unit and is not yet used as an output, e.g., as part of a final image frame that is transferred off the image sensor chip. The following steps are then repeated for the second subframe exposure SF2: pixel data of each row K, K+1, . . . , K+4 relating to the second subframe exposure SF2 is read out after subframe exposure termination, converted into digital pixel row data in step 502-2, processed by the PML in step 503-2, and written to the pixel memory unit in step 504-2. However, processing by the PML in step 503-2 now includes the conditional use of the previously obtained sample of digital pixel row data as additional input operand, wherein the previously obtained sample has been buffered in the pixel memory unit during the time elapsed between the end of step 504-1 and the start of step 503-2. After processing by the PML of the samples of two samples of digital pixel row data relating to subframe exposures SF1 and SF2 is completed in step 503-2, the processing result (e.g. combination of the two samples, e.g. sum or difference) is written back to the pixel memory unit in step 504-2 and subsequently read out therefrom in step 505 for the purpose of transferring the processed row of pixel data, as part of the final full image frame, off the image sensor chip. It can be seen in FIG. 5 (e.g., dotted vertical lines for guidance) that although multiple pixel rows are processed in parallel, the different pipeline stages are temporally balanced such that each pipeline stage only operates on the pixel data of a single row of pixels. In particular, the data path for the pixel row data is organized such that no two rows addressed simultaneously for the readout and conversion of their pixel data.

In embodiments of the invention, the overall exposure period for a full image frame of the image sensor, i.e. the sum of all subframe exposure periods, is controllable via the reset control signal, e.g. by controlling the moment in time relative to the full frame period at which the photoelectric elements of a pixel row are reset and exposed to incident light thereafter. The ratio between the first subframe exposure period and the second subframe exposure period is controllable via the readout control signals in respect of the first subframe exposure. More specifically, the first subframe exposure period ends and the second subframe exposure period immediately begins as soon as a pixel row has been selected for readout and a transfer pulse has been applied to the transfer gates of the pixels of that row, which induces a partial transfer of the already generated photocharges in the respective pixels. In contrast thereto, the second subframe exposure period ends as soon as a pixel row has been selected for the second time within the same frame interval for readout and a transfer pulse of larger magnitude compared to the transfer pulse relating to the first subframe exposure has been applied to the transfer gates of the pixels of that row, whereby a complete transfer of all the remaining photocharges in the respective pixels is initiated. If in embodiments of the invention more than two subframe exposures are taking place, then the applied row select signal and transfer pulse at the end of each but the last one subframe exposure determine the duration of that subframe exposure. Moreover, the amplitude of the transfer pulse to be applied in respect to each but the last one subframe exposure is adapted to cause only a partial transfer of the photocharge present in the pixels' photoelectric elements, whereas it is increased in respect of the last subframe exposure such that a complete transfer of the remaining photocharge is triggered. Preferably, the amplitude of the transfer pulse is kept constant for each but the last one subframe exposure. Furthermore, embodiments are not restricted to solely read out the pixel's buffered photocharge signal, referred to as a pixel's signal level, i.e. the voltage signal generated by the buffered charge-voltage converter in response to the transferred photocharge present on one or both charge accumulation elements, but preferably include the further readout of the pixel's buffered reset signal at both high and low conversion gain, referred to as the pixel's high gain and low gain reset level, i.e. the voltage signal generated by the buffered charge-voltage converter in response to the residual charge that is still present on the first charge accumulation element, or first and second charge accumulation element, after having reset the pixel. This has the advantage that correlated double sampling (CDS) can be performed by the readout blocks of the image sensor.

Figure 6A:
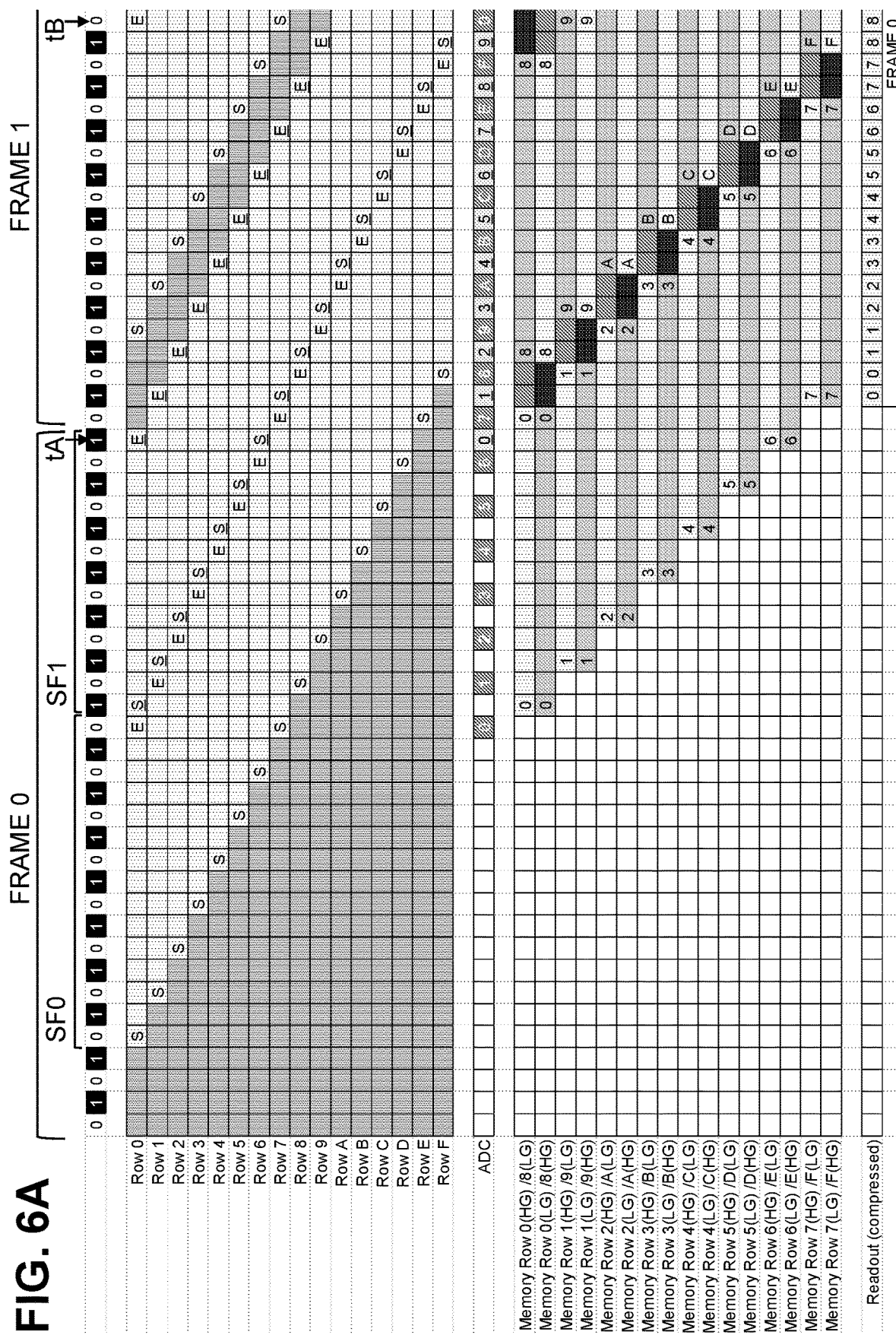
FIG. 6A-B and FIG. 7A-B are timing diagrams illustrating the time-interleaved operation of two electronic rolling shutters on a pixel subarray of an image sensor according to the invention and the combination and intermediate storage of pixel row data obtained from two subframe exposures.
Figure 6B:
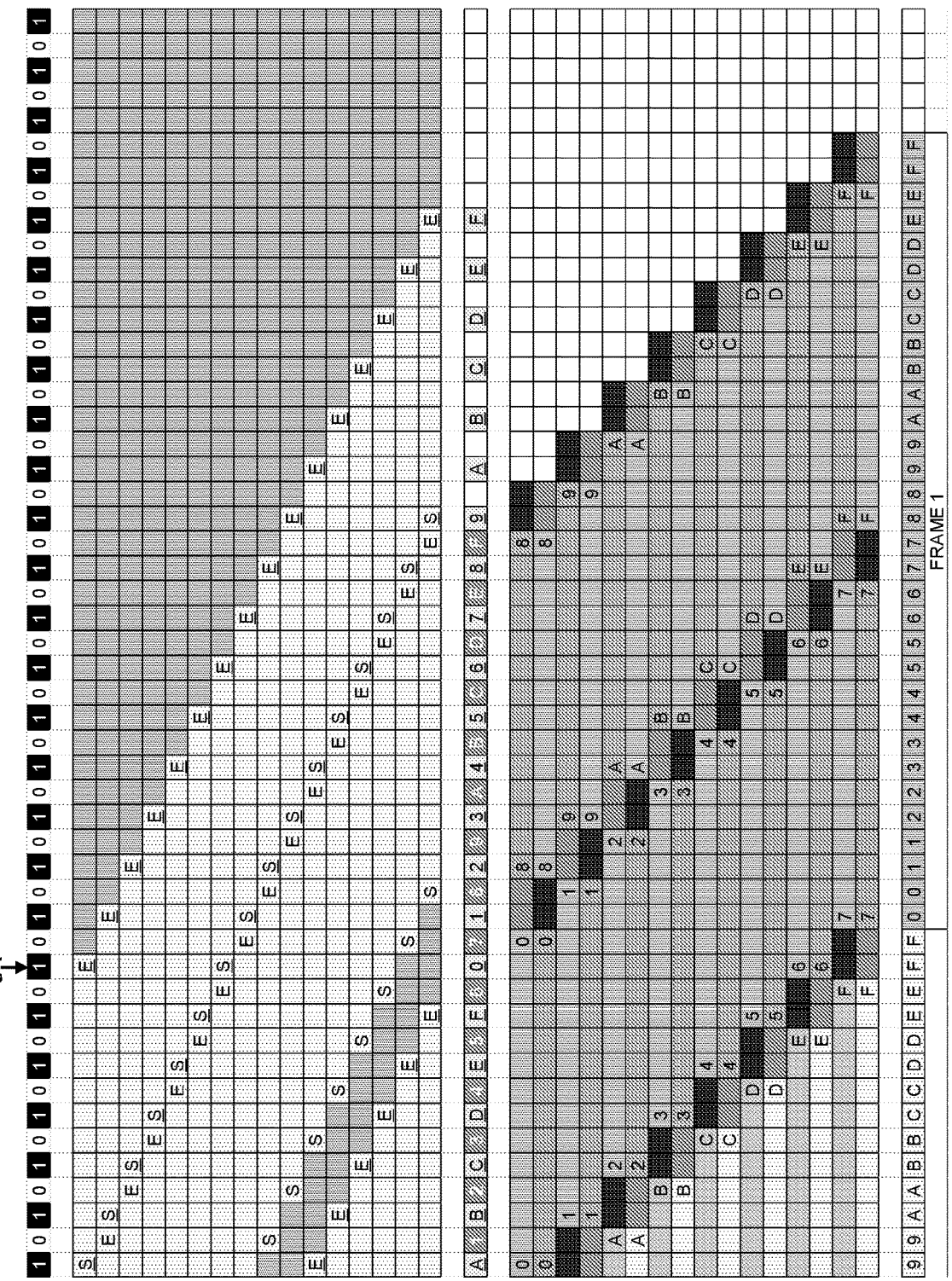

FIG. 6 is a timing diagram which describes in more detail the timing and time resources required by each pipeline stage. For a better understanding of the present figure, the exemplary timing diagram only considers sixteen pixel rows (Row 0 to Row F) per pixel subarray. Embodiments of the invention may contain much more pixel rows per pixel subarray, e.g., hundreds of pixel rows or even more than one thousand pixel rows.

According to the timing diagram of FIG. 6, each full frame period, e.g., Frame 0, Frame 1, etc., is divided into a plurality of unit time slots, e.g. the time slots labelled '0' or '1' in the first line of the diagram. It is noted that consecutive unit time slots are assigned to either an even position, labelled as '0', or an odd position, labelled as '1'. The even and odd time slot positions are associated with a first and a second rolling shutter operation respectively. Importantly, the control sequences for the first and second rolling shutter, i.e., reset and readout select, are time-interleaved with row control signals relating to the first and second rolling shutter operation being supplied only during the even time slots and odd time slots respectively. The unit time slot which marks the start of each subframe exposure in respect of a particular pixel row of the pixel subarray is labelled by the letter 'S', while the unit time slot which marks the end of that subframe exposure in that row is carrying the letter 'E'. The start of the first subframe exposure may correspond to the falling edge of a row-wise applied reset control signal that steps, one by one, through the pixel rows composing the subarray and resets the photoelectric elements of the pixels in that row to a predetermined voltage level. In contrast thereto, the second or any further subframe exposure, if contiguous in time with the preceding subframe exposure, does not require delivery of an extra reset signal to the pixels' photoelectric elements in order to start, but begins seamlessly after the preceding subframe exposure has ended with a partial transfer of the photocharge generated in the photoelectric element. It is observed that this does not exclude the delivery of a reset signal to only the first and second charge accumulation element of each pixel, which removes the previously transferred photocharge and thus makes room for another subframe exposure reading. Contrary to a full or complete transfer of the photocharge generated during a conventional exposure interval, a partial transfer only skims off the portion of the photocharge present in the potential well associated with the photoelectric element that exceeds a programmable threshold potential (e.g., threshold voltage level). The programmable threshold is determined by the magnitude of the transfer pulse that is supplied to the transfer gates of the pixels. As can be seen in the timing diagram, a first rolling shutter sequence is starting from Row 0 and advances incrementally up to Row F, wherein a next row is selected at every second unit time slot. As a result, the first rolling shutter control sequences and the associated first subframe exposure are always timed to be aligned with the even unit time slots (i.e., group '0'). Likewise, the second rolling shutter control sequences and the associated second subframe exposure are always occupying the odd unit time slots (i.e., group '1'), whereby any interference between the two concurrently running electronic rolling shutters is avoided. Here, an interference between two or more rolling shutters that operate in parallel on the pixel rows of a pixel subarray is understood as an attempt to select and read out the pixel row data (signal level or reset level) of two different rows of the same subarray simultaneously.

In the present timing diagram a double subframe exposure SF0, SF1 per frame period is chosen, but a larger number of subframe exposures can be accommodated within the full frame period. For instance, four subframe exposures may compose the total exposure time within a single full frame acquired by the image sensor, in which case unit time slots are assigned positional numbers '0' to '3' (e.g. position modulus four) and each positional group '0' to '3' is associated with the row control signals relating to only one out of four time-interleaved rolling shutter sequences.

The duration of the unit time slot is typically determined by the pipeline stage with the largest latency. In the present embodiment, for example, the unit time slot corresponds to the combined duration of settling time of the signals present on the bit lines, sample and hold, and the time required to perform analog-to-digital conversion by the A/D conversion unit in respect of a fast sequential measurement of the pixel signal levels both at high conversion gain and low conversion gain. If CDS is applied, the signals present on the bit lines include both the pixel reset level and the pixel signal level, meaning that the unit time slot is the sum of settling time, sample and hold time, and the time for A/D conversion in respect of fast sequential CDS measurement in the high gain readout channel and the low gain readout channel. Nonetheless, for the purpose of implementing image sensors at even higher speed, more pipelining may be added in the readout path and the unit time slot may be subdivided or redefined in order to realistically reflect the presence of the added pipeline stages. A fast sequential measurement of the high and low gain pixel signal levels can be performed by reducing the resolution of the ADC component in the A/D conversion unit, e.g., two 12 bit conversions can be performed in the same time as a single 14 bit conversion. Alternatively, the A/D conversion unit may comprise two parallelly working ADCs instead of a single ADC allocated to the pixel rows if FIG. 6. Within each unit time slot, the A/D conversion unit is thus capable of converting the pixel data of exactly one row of pixels in the pixel subarray into the digital domain. The row of pixels that is undergoing A/D conversion during a particular unit time slot is indicated by its row number in the pixel subarray (e.g., numerals '0' to 'F' in the ADC line of FIG. 6). The converted pixel data is available precisely one time slot after the corresponding subframe exposure period has ended (e.g., indicated by letter 'E'). There can be moments at which the A/D conversion unit is idle and does not perform any pixel row data conversion (e.g., blank unit time slots in the ADC line in FIG. 6).

Each subframe exposure period SF0, SF1 as well as the full frame period can thus be expressed as an equivalent number of unit time slots. For example, in the embodiment referred to in FIG. 6, the first subframe exposure SF0 lasts for fifteen time slots, the second subframe exposure lasts for thirteen time slots, and each full frame (Frame 0, Frame 1) is composed of thirty-two time slots. The shorter the unit time slot is relative to the full frame period, and the shallower the pipeline depth is, the more subframe exposures can be accommodated in a single full frame period, which is considered as fixed over time. For instance, the shortest possible single frame period is fixed by the maximum achievable external I/O rate at which preprocessed HDR frame data can be transmitted from the image sensor chip to external devices, e.g., external storage devices such as external RAM or hard drive. A typical value for the maximum achievable external I/O rate in embodiments of the present invention may be 120 fps for double subframe exposure mode of operation, but depends on other factors too, e.g., such as number of pixel rows and readout blocks and ADC bit resolution. For the example in FIG. 6, this means that a pixel row worth of frame data is transferred every 520.8 µs, corresponding to two consecutive time slots in the readout row (last row in FIG. 6) containing the same numeral and thus referring to data obtained from the same pixel row, while one unit time slot lasts only for 260.4 µs. These values are given for illustrative purposes and do not necessarily reflect frame data rates and unit time slot durations of actually manufactured image sensors, which may comprise many more pixel rows as compared to the example of FIG. 6.

For example, an image sensor with megapixel resolution may have unit time slot duration of about 15 µs, which allows for a maximum internal subframe rate of 240 fps at 14 bit ADC resolution (ADC resolution can be traded for speed or higher number of subframes). This exemplary image sensor thus supports outputting preprocessed HDR frame data to external devices (i.e., off-chip) at an I/O rate of 120 fps, in case of double subframe exposure mode, and 60 fps, in case of quadruple subframe exposure mode, each at 14 bit ADC resolution.

As indicated in FIG. 6, the final frame data read from the on-chip pixel memory may be transmitted in a compressed format. Here, compression relates to the fact that the combined pixel signal levels for high and low conversion gain settings of the pixel, which leads to the improved dynamic range of the image sensor, may occasionally exceed the available bit depth of the pixel memory. In such events, a scaling operation is performed prior to writing back to the pixel memory the combination of high gain and low gain pixel signal levels, whereby the scaled signal combination again fits into the available bit depth of the pixel memory. For example, a combination of a 12 bit wide high gain pixel signal level and a 12 bit wide low gain pixel signal level may result in a 13 bit wide combined HDR value, which does not fit into a 12 bit wide pixel memory without causing overflow. In these cases, the combined HDR value is rescaled (scaling factor <1) such that it fits again into the 12 bit wide pixel memory. Instead of a simple scaling operation, a more detailed compression algorithm may be used that combines pixel reading for the high gain channel and the low gain channel differently in different signal subranges, e.g., exploiting varying noise properties in the different signal subranges to alter a precision of the high gain and/or low gain pixel readings. Compressed output data can be sent off-chip at a rate twice as high as compared to the high gain data and the low gain data being sent off-chip separately, e.g., one time slot per row of pixels versus two time slots in the last line of FIG. 6.

As can be further seen from the timing diagram in FIG. 6, the processed high gain and low gain pixel row data is written to different addresses of the pixel memory, thereby allowing separate readout of pixel data obtained for either high conversion gain or low conversion gain in operation modes of the image sensor that does not use the dual gain functionality of the pixels, e.g. simple low gain or high gain operation without extended DR. Such operation modes can also include different HDR modes of the image sensor which do not rely on partial transfer of the generated photocharge within a single full frame period. For example, offline or online blending of multiple subframe exposures or multi-frame exposures with different exposure times and/or conversion gains into one HDR image frame (single frame or multi-frame exposure bracketing), which can take place on the image sensor chip or on external data processing means. The case of combining multiple subframe exposures or multiple full frame exposures with at least two exposure time settings into a HDR image frame is also known as multiple-exposure operation and can be performed on an image sensor chip according to the invention, additionally or alternatively to the dual gain conversion by the pixels, to obtain HDR image frames. Different exposure time settings result in different but fully deterministic slopes and knee points between slopes in the linearity plot of the image sensor (digital number as a function of illumination). Hence, in image frames with large intra-scene dynamic range, the pixel output signals obtained through unequal exposure time settings can be easily re-linearized, internally or externally off-chip, to yield a linear HDR signal without calibration. The ratio of subframe exposure periods of a pair of successive subframes, together with the current conversion gain, controls the change in the response slope.

Figure 11:
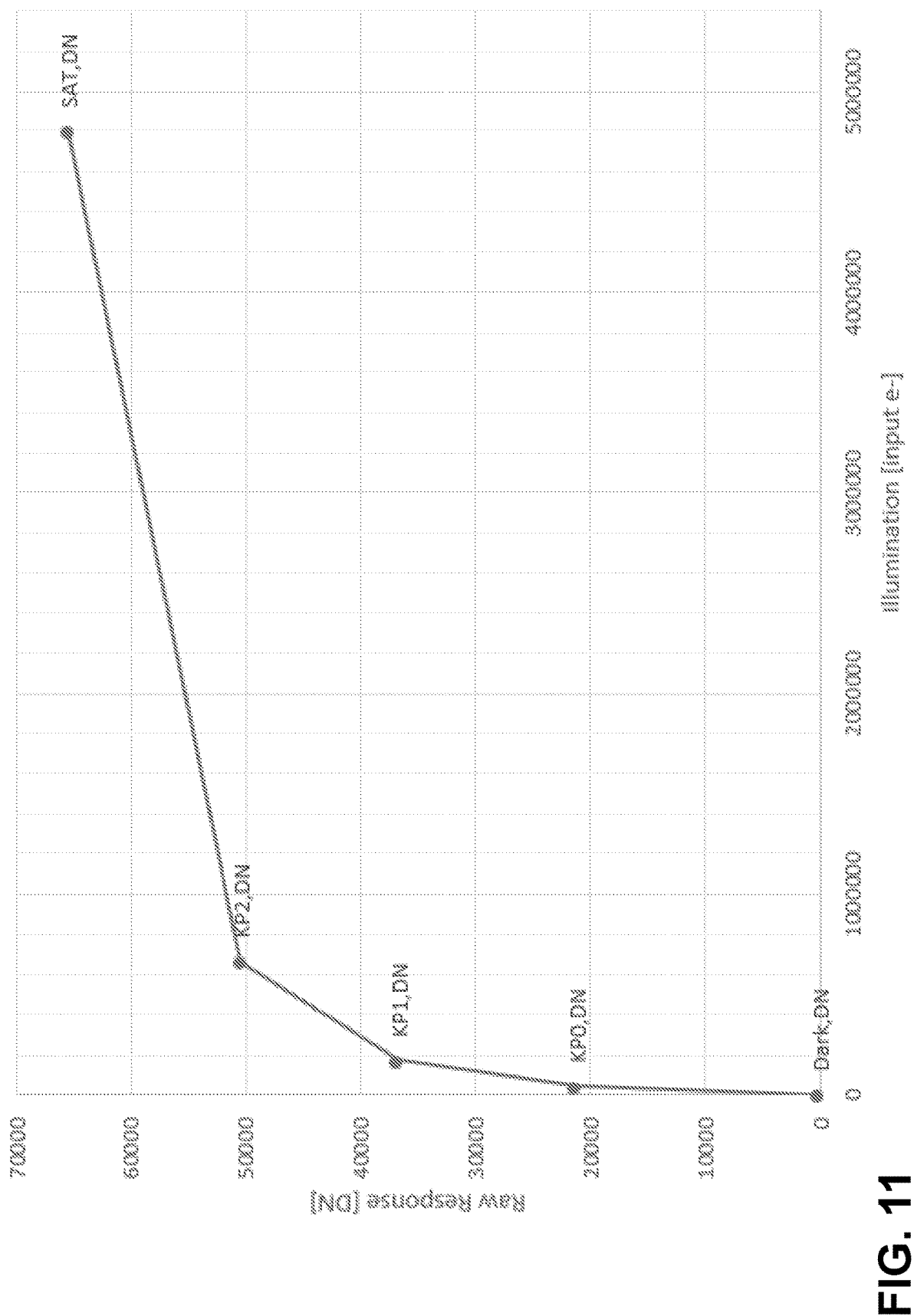
FIG. 11 and FIG. 12 illustrate the image sensor output before and after applying linearization to sensor output signals, respectively, wherein the sensor output signals are obtained for an image frame with four different subframe exposure timings.
Figure 12:
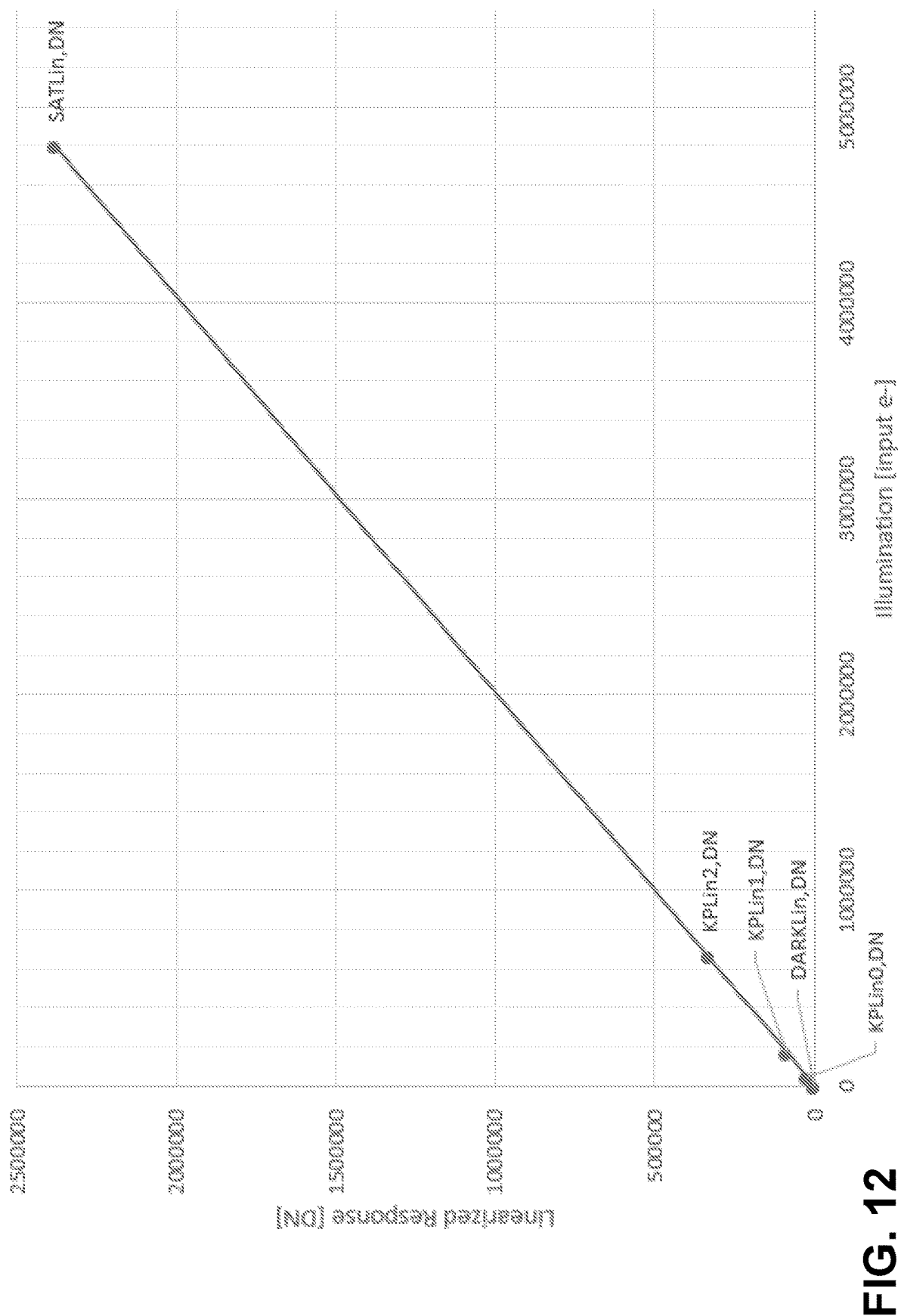

FIG. 11 illustrates the different response slopes and knee points for a single conversion gain (e.g., only low gain) and a total of four subframe exposures per full image frame. In this example, the exposure periods of the subsequent subframes are increasing, e.g., as Texp1=128 Trow, Texp2=32 Trow, Texp3=8 Trow and Texp4=2 Trow for a full exposure time of 10.2 ms, where a row time (Trow) is equal to about 60 μs. The corresponding sensor output after linearization is shown in FIG. 12. The location of the knee points on the vertical axis (raw response) may be fully programmable, e.g., by introducing a programmable clipping block in the signal path for clipping the pixel signals in the digital domain.

As a particular example of combined multi-frame bracketing and multi-exposure, one can cite the mode of operation in which a first full frame with increased DR is acquired via two subframe exposures at low conversion gain and with large exposure time ratio, and a second full frame with increased DR is acquired via two subframe exposures at high conversion gain and also with a large exposure time ratio. Eventually, the first and second full frames can be composed offline into a final image frame with even further increased DR.

In contrast to the separate storage locations for high and low conversion gain pixel data, processed digital pixel data obtained in respect of two different pixel rows in the same subarray, e.g. Row 0 and Row 8, Row 1 and Row 9, etc., is mapped to the same address of the pixel memory in order to save memory capacity requirements and associated chip area. Moreover, in embodiments of the invention in which the HDR image frame is generated as a result of combining multiple subframe exposures with partial photocharge readout and different conversion gain settings, described in more detail hereinbelow, only one storage location (e.g., by address or line) in pixel memory for the high conversion gain and the low conversion gain pixel row data is needed. Therefore, the allocation of two lines of pixel memory per pixel row in the subarray in FIG. 6 is seen as optional and a more area- and energy-efficient solution may only allocate a single line of pixel memory per pixel row and subarray. In the latter case, the overall storage capacity of the pixel memory can be seen to be smaller than the storage size associated with a full frame of image data.

According to FIG. 6, immediately after A/D conversion has completed in respect of a pixel row selected for readout, i.e., exactly one unit time slot later, the processed pixel row data for high and low conversion gain is stored in the pixel memory while the A/D conversion unit proceeds with subsequently selected row of pixels. Here the assumption is made that the processing of converted, digital pixel row data and the write operation of the processed pixel row data can be performed within one unit time slot, because these two steps have individual latencies that are shorter than one unit time slot.

More specifically, the pixel row data (e.g. pixel signal level minus the pixel reset level in case of CDS) that has been obtained for the low conversion gain channel of the pixels after a first partial transfer may be written to the pixel memory unconditionally, as soon as A/D conversion of the pixel row has completed at the end of the first subframe exposure SF0 in each frame. During intermediate subframe exposures, occurring between the first and the last subframe exposure if more than two subframe exposures are programmed, each subsequent low gain pixel row data (e.g. pixel signal level minus the pixel reset level in case of CDS), obtained in respect of each further partial transfer, may be subject to processing by the PML and the result of this processing is then written back to the pixel memory. In addition to managing the dataflow from and to the pixel memory, the processing by the PML may comprise performing basic clipping and/or scaling operations on the digitized pixel data (e.g., after CDS).

In preferred embodiments, the processing by the PML also comprises conditionally combining, e.g., conditionally adding, the processed or unprocessed (raw) pixel row data of the current subframe to the buffered pixel row data in the pixel memory. In such a case, the buffered previous data is fetched from the pixel memory by the PML, wherein the fetching may be performed while the pixel row data of the current subframe is still undergoing A/D conversion. The condition to be satisfied for the PML to carry out the combining of pixel row data relating to different subframes may involve the step of comparing the pixel data to a first programmable threshold level TLG. Depending on the result of this comparison, the pixel data of the current subframe is combined with the pixel data of a previous subframe that is buffered in the pixel memory, e.g., when the pixel data is lower than the threshold TLG, or is discarded, e.g. when the pixel data is larger than the threshold TLG. Discarding of pixel data may occur, for instance, if the image sensor device is operated in short intermediate subframe exposure mode, in which only the pixel data of the shortest subframe exposure is kept. The event of discarding pixel data may be monitored during each full frame exposure period to select only the pixel data of the shortest intermediate subframe for output. If the pixel memory does not yet contain valid data for the current image frame (i.e., comprising the plurality of subframes), the combining step may be replaced by a direct write to the pixel memory. Alternatively, the pixel memory can be initialized to a default value, e.g., zeros, at the beginning of each new image frame.

Eventually, the processed or raw pixel row data related to the high gain channel and the low gain channel, e.g. the pixels' CDS signals for the high gain channel and the low gain channel, is sent to the sensor output interface directly at the end of the last subframe exposure (e.g. after the full photocharge transfer in subframe SF1 in FIG. 6), or is conditionally processed by the PML, depending on which output format has been selected. The conditional processing by the PML for the last subframe may include the following steps: The high gain CDS signal of each pixel is compared to a second programmable threshold value, THG, and if it is lower than the threshold THG, the high gain CDS signals of the pixels in one row is written to the pixel memory. In this case, the previously stored pixel data for that row is overwritten. Alternatively, the previously stored pixel data for that row could be fetched by the PML and combined with the currently processed high gain pixel data, e.g. by compressing high gain pixel row data and low gain pixel row data into a single row of data, and the result of this PML operation is stored in the pixel memory as the final result for the pixel data of that row in the current frame. If, instead, the threshold value THG is exceeded, the high gain data for the pixel row may be discarded and the low gain data for that pixel row is used by the PML instead, e.g., by combining it (e.g. adding and optionally also compressing) with the previously stored pixel row data after fetching from the pixel memory through the PML.

The second full frame in the timing diagram of FIG. 6 also comprises two subframe exposures, identical to the first full frame. In the present embodiment, the time interval between the end of the last subframe exposure SF1 of the first full frame and the beginning of the first subframe exposure SF0 of the second full frame, during which no rolling shutter exposure takes place, is chosen as short as possible compared to a full frame period, with the result of obtaining the longest possible overall frame exposure. Indeed, the two subframe exposures extend over almost the entire full frame period (e.g. 87.5%) and cannot be extended further without avoiding interframe interference of the electronic rolling shutters, e.g. avoiding that the second rolling shutter of the first frame and the first rolling shutter of the second frame attempt to simultaneously read out different rows of the subarray, i.e. two unit time slots labelled 'E' being exactly coincident in time. The moments in time tA and tB at which a delayed, second electronic rolling shutter starts stepping through the rows of the subarray before an earlier, first electronic shutter has ended, are situated at the end and near the mid-point of the frames respectively. This is a further indicator for the long overall frame exposure and the nearly balanced exposure times of the two subframe exposures.

However, embodiments of the invention are not limited to long frame exposures, but can equally be adjusted to perform shorter frame exposure, for instance to better adapt the image sensor to the distortion-free capturing of fast moving objects. A detailed timing diagram for the shortest possible overall frame exposure consisting of two contiguous subframe exposures SF0, SF1 of equal subframe-exposure periods (three unit time slots each) is shown in FIG. 7 for a pixel subarray with an equal number of rows, unit time slot duration and full frame period as in FIG. 6.

Figure 7A:
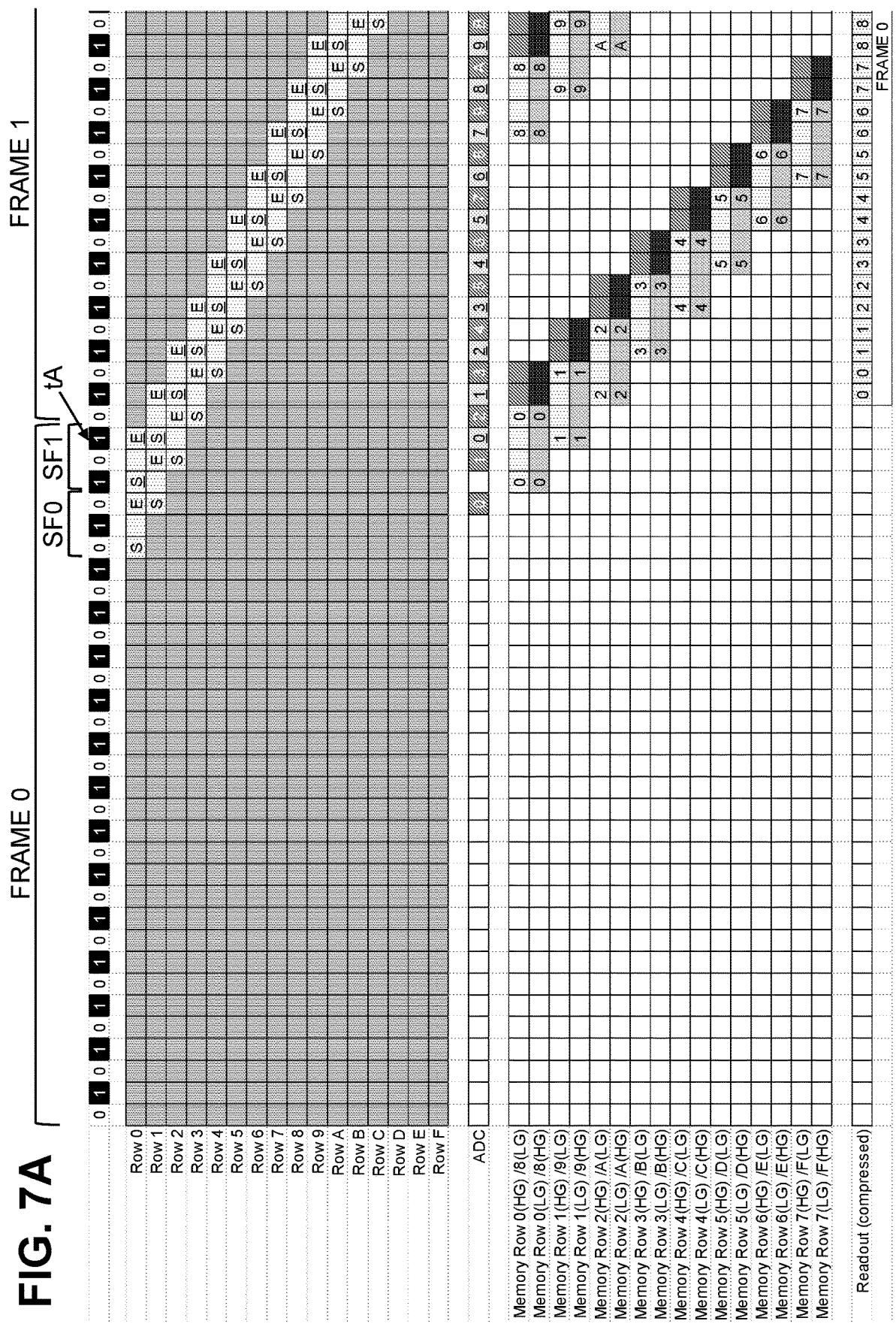
Figure 7B:
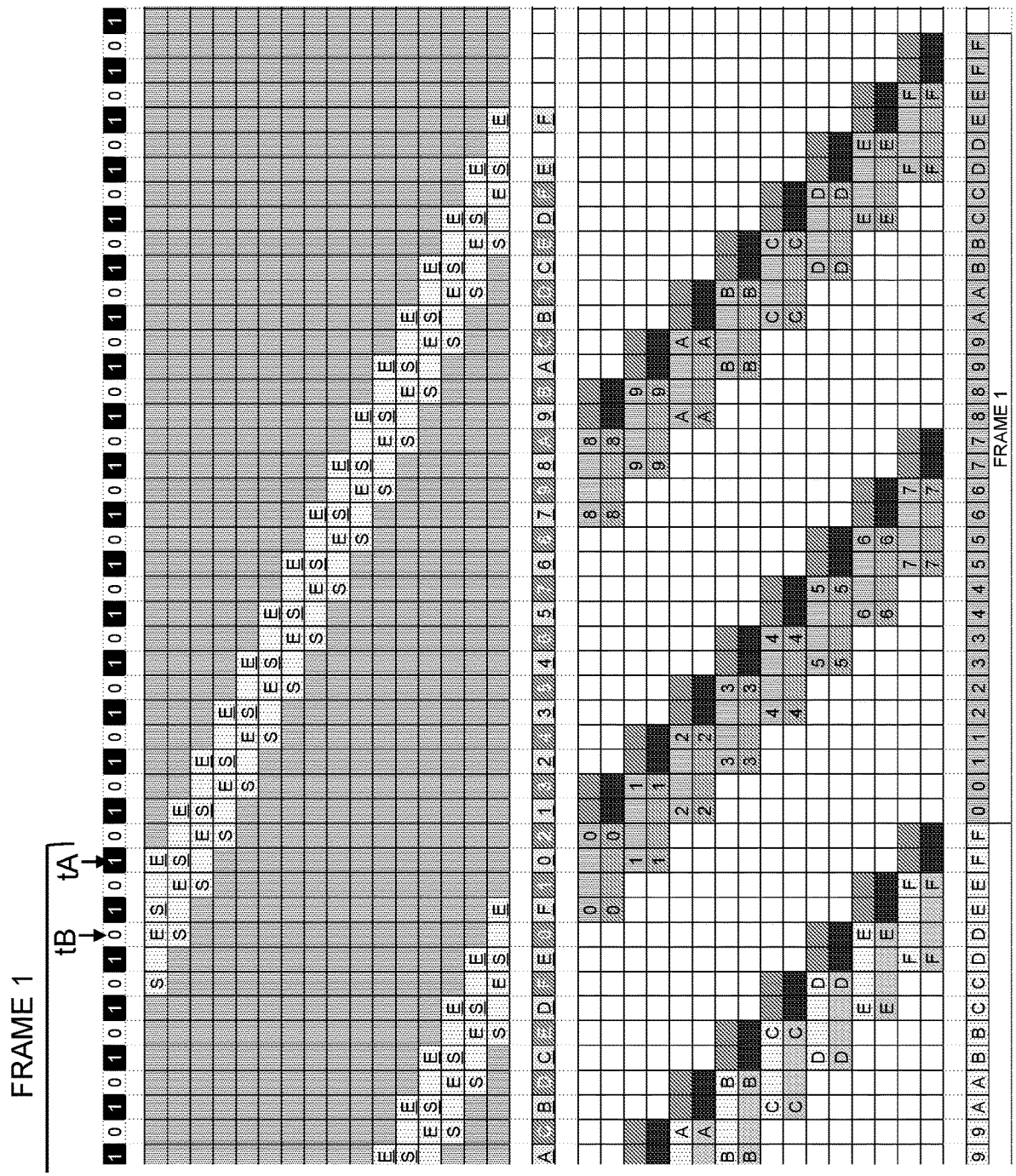

Furthermore, full frames may be acquired continuously in embodiments of the invention, or a predetermined number of consecutive frames may be acquired, as indicated in FIG. 6 and FIG. 7. In embodiments of the invention, each new full frame generally starts with a reset operation on the photoelectric elements of the pixel row the first time it is selected in the new frame. In contrast to FIG. 6, the moments in time tA and tB at which a delayed, second electronic rolling shutter starts stepping through the rows of the subarray before an earlier, first electronic shutter has ended, are both situated near the end of the frames and are separated only by the very short subframe exposure period.

Figure 13A:
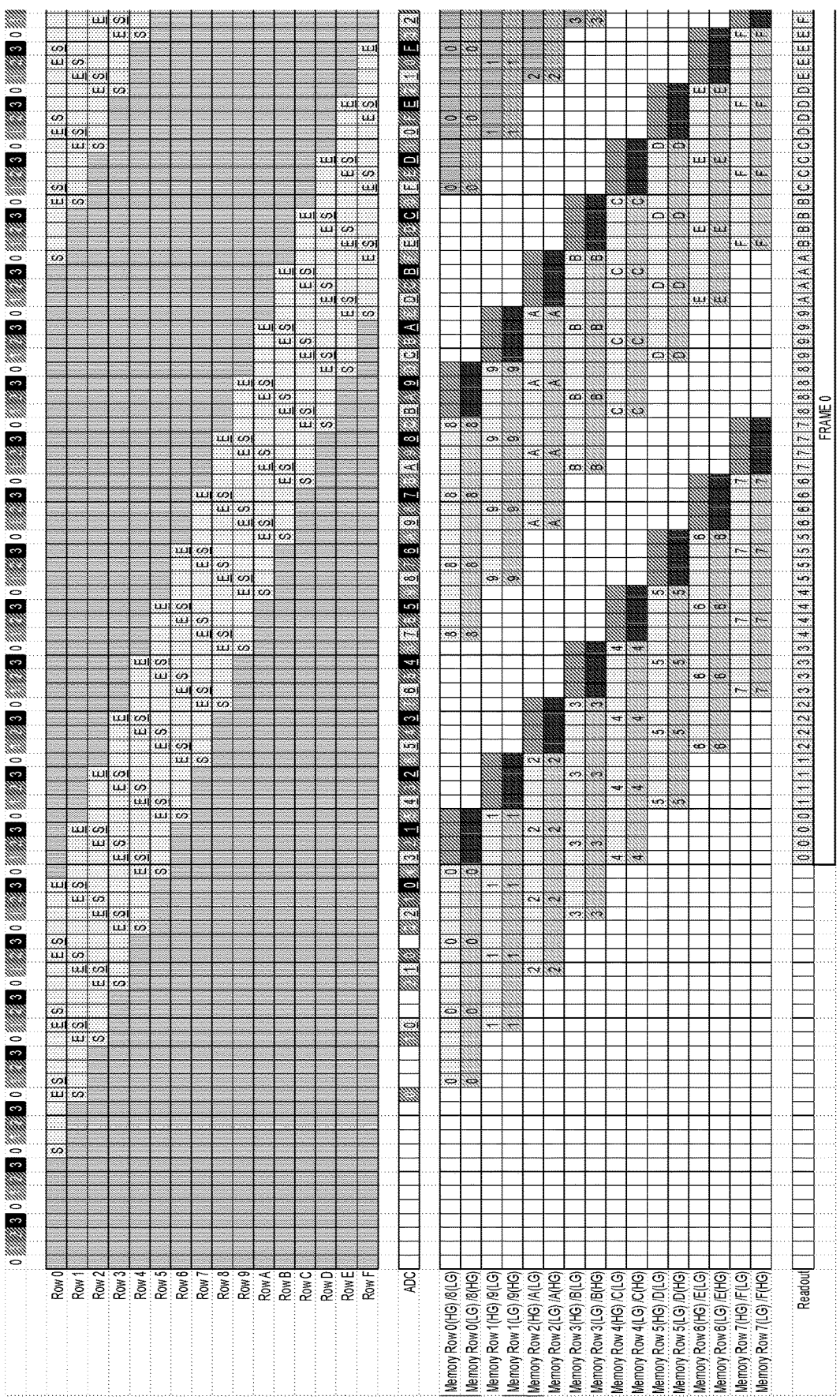
FIG. 13A-B is a timing diagram illustrating the time-interleaved operation of four electronic rolling shutters on a pixel subarray of an image sensor according to the invention and the combination and intermediate storage of pixel row data obtained from four subframe exposures.
Figure 13B:
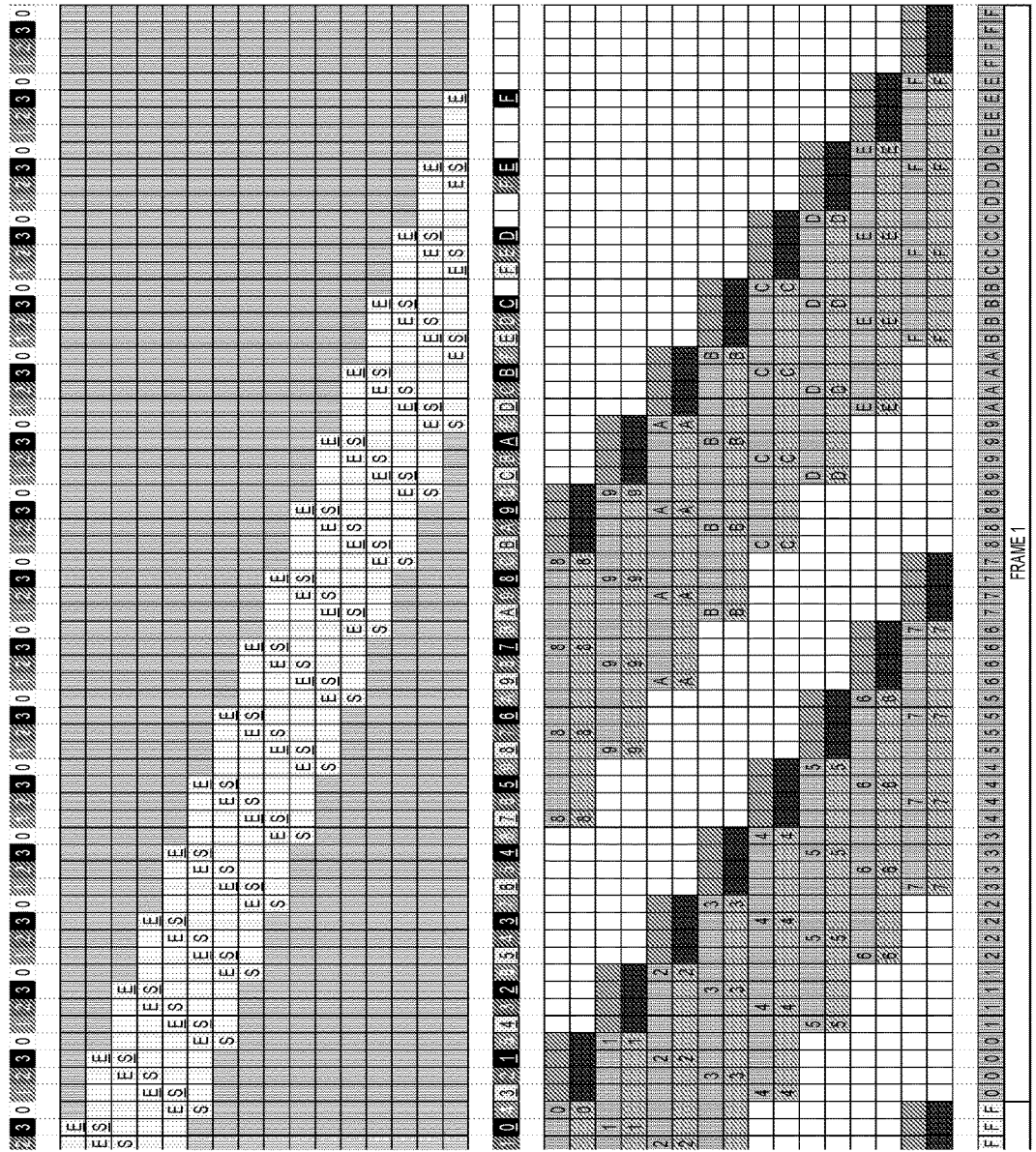

FIG. 13 shows a timing diagram for the quadruple subframe exposure operation (partial or full transfer mode) of an image sensor device according to the invention. Subframe exposures SF0 to SF3 are contiguous in time and have equal subframe-exposure periods. In the partial transfer mode, only the fourth subframe exposure SF3 is read out with the high gain configuration of the pixels. The readout pipeline is analogous to the ones described hereinabove, e.g., as in FIG. 6 and FIG. 7.

In the above-described embodiments, the first and the second threshold (TLG and THG) preferably are programmable, e.g., by software or by user directly, as a function of overall exposure time for the image frame to be acquired and the number of subframes, but may be fixed values in other embodiments. The first and the second threshold (TLG and THG) are generally constant across the pixel array, but they do not have to be of the same value, e.g. TLG and THG can differ in magnitude, and they are typically independent of the potential barriers set by the partial and the complete charge transfer pulses applied to the pixel transfer gates.

In the above-described embodiments, the readout, A/D conversion, digital data processing and pixel memory write stages were performed on entire rows of image sensor pixels. However, depending on the trade-off between speed, area, power consumption for an image sensor according to the invention, blocks of pixel-related data (e.g. reset levels and signal levels) do not necessarily have to correspond to pixel rows, but could be performed on pixel groups (e.g. a row segment or group of columns in a row, e.g. even/odd channels) or even on a pixel-by-pixel basis instead.

In embodiments of the invention, a state machine may be used that triggers, for each unit time slot, the A/D conversion of pixel data as well as the processing of digitized pixel data in the parallelly running PML. Once triggered by the state machine, the A/D conversion unit may use its own clock, which typically is the fastest running clock of the components comprised by the control and readout circuitry. Other dedicated clocks with their specific clock speeds may be used in the components of the control and readout circuitry, e.g., a sequencer clock, a clock for regulating memory access, etc., which generally run at a lower speed than the clock of the A/D conversion unit, e.g. a factor 5 to 10 slower.

It is also possible to operate the image sensor in a LOFIC-like mode (lateral overflow integration capacitor), in addition to the multiple subframe and partial readout operation already mentioned. In the LOFIC-like mode, the photocharge of an oversaturated photodiode spills over into the second charge accumulation element, or the combination of first and second charge accumulation element. The bias voltages of the transfer gate and the gain switch are set accordingly. In the LOFIC-like mode, especially adapted to high illumination conditions, the low gain channel of each pixel is read out twice: the overflow charge on the sense node is read out first (defining the overflow level), followed by a reset operation and reset reading of the sense node (e.g. voltage reset with respect to the connected first and second charge accumulation element) and another readout of the sense node in respect of the fully or partially transferred photocharge from the photosensitive element (defining the photodiode/signal level in the low gain channel). Correlated double sampling (CDS) is preferably performed for the photodiode level in the low gain channel, using the reset reading for pixel noise correction. Digital double sampling may be implemented for the overflow level, using again the reset reading for correction. Alternatively, a reset operation and corresponding reset reading may be performed at the start of each new image frame and used to implement true CDS for the overflow level.

In the LOFIC-like mode, the low gain pixel data may first be compared to a threshold value for the low gain channel (TLG) before the pixel data is written to the pixel memory unit at the end of each but the final subframe exposure. If the low gain pixel data is lower than the threshold value TLG, then the overflow signal level is ignored, e.g. by setting it to zero to avoid noise or dark current contributions, or else if the low gain pixel data is greater than the threshold value TLG, then the overflow signal and the pixel signal for the low gain channel are summed directly and the partial sum for the respective subframe exposure is stored in the pixel memory unit. Direct summation is possible since the overflow signal and the low gain pixel signal are both obtained with respect to the same low conversion gain setting of the pixel. For the final subframe exposure only, the pixel is read out in the high gain channel, between the readout operations for the overflow signal and the low gain pixel signal respectively. Only if the high gain pixel data is less than a threshold value for the high gain channel (THG), is the high gain pixel data retained for the sensor output operation, e.g., sent off-chip separately. Otherwise, the high gain pixel data is ignored for the purpose of image sensor data output, or is transmitted in compressed format together with the low gain pixel data. As for the non-final subframe exposures, the low gain pixel data may first be compared to the threshold value for the low gain channel (TLG) also for the final subframe exposure, to decide whether the overflow signal should be added to the low gain pixel data, before adding the result to the partial sum read back from the pixel memory unit.

In a second aspect, the present invention relates to an operating method of an image sensor according to the first aspect, which yields image frames with an increased dynamic range. The method exploits the fact that all but the last one subframe exposure of a plurality of subframe exposures, each having an exposure time smaller than a full frame period, can be read out partially and all the subframe exposure combined to effectively increase the full well capacity of the photoelectric elements and to limit the increase in the readout noise associated with multiple exposures. Moreover, the image sensor does not saturate even in high illumination conditions. In conjunction thereto, the conversion gain of the images sensor pixels is switched between a high conversion gain and a low conversion gain to obtain an optimum signal-to-noise ratio under either low-light or strong-light exposure conditions relative to each pixel.

Conventional image sensors using multiple exposures with a full transfer of the photocharge generated in the photoelectric element of the pixel require the floating diffusion node to have the same associated full well capacity (FWC) as the photoelectric element. This limits the FWC of the photoelectric element, e.g., PPD, if a pixel with good charge-to-voltage conversion gain is sought. In embodiments of the invention, inducing only a partial transfer of the generated photocharge from the photoelectric element to the charge accumulation elements overcomes this limitation and the FWC of the photoelectric element can be made larger than the FWC associated with the first charge accumulation element, and possibly also larger than the combined FWC associated with the first and second charge accumulation element. In addition thereto, embodiments of the invention limit the noise related to the multiple readout of each pixel by only transferring a portion of the generated photocharge from the photoelectric element to the charge accumulation element at the end of each one but the last subframe exposure and initiating a complete transfer of the remaining photocharge exclusively for the last subframe exposure. Whereas conventional methods relying on the addition of N subframe exposure readings (full transfer of the integrated photocharge) increase the resulting readout noise by a factor of sqrt(N), the readout noise (e.g. dark noise) occurs only once at the end of the last subframe exposure in embodiment of the invention, when the high conversion gain is applied to read out pixel signal levels under low-light conditions. Under such conditions the intermediately generated photocharge is not affected by the partial transfer operation. In case of higher illumination conditions, a part of the intermediately generated photocharge is transferred and converted in the low conversion gain setting of the pixel and consecutive readouts at low conversion gain are added to a final result. In such cases, the high gain path is not used, thus benefiting from the larger FWC associated with the low conversion gain setting of the pixel.

Figure 8:
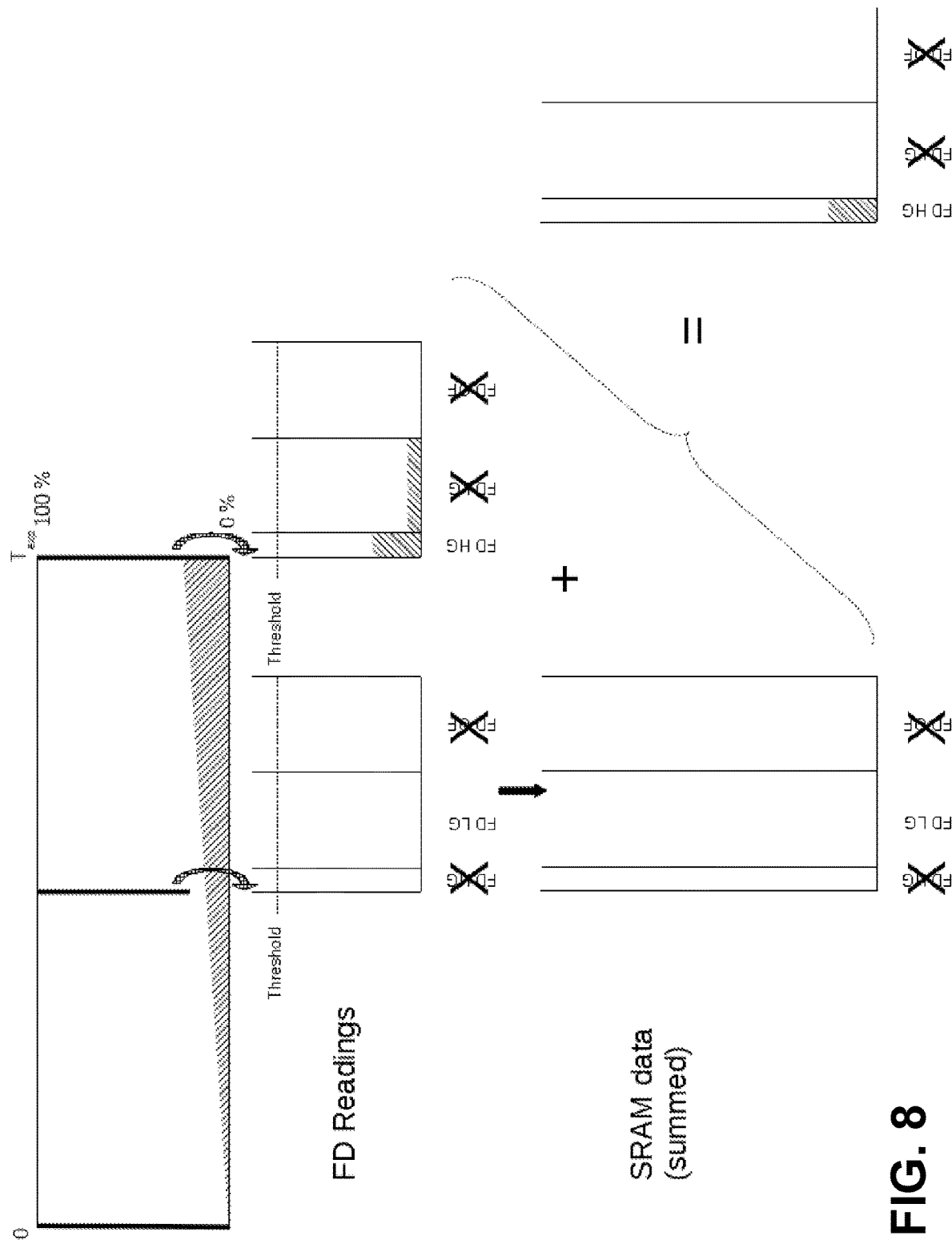
FIG. 8 to FIG. 10 explain a method of operating an image sensor under different illumination conditions, in accordance with an embodiment of the invention, wherein subframe exposures are combined into a final image frame with extended dynamic range.
Figure 9:
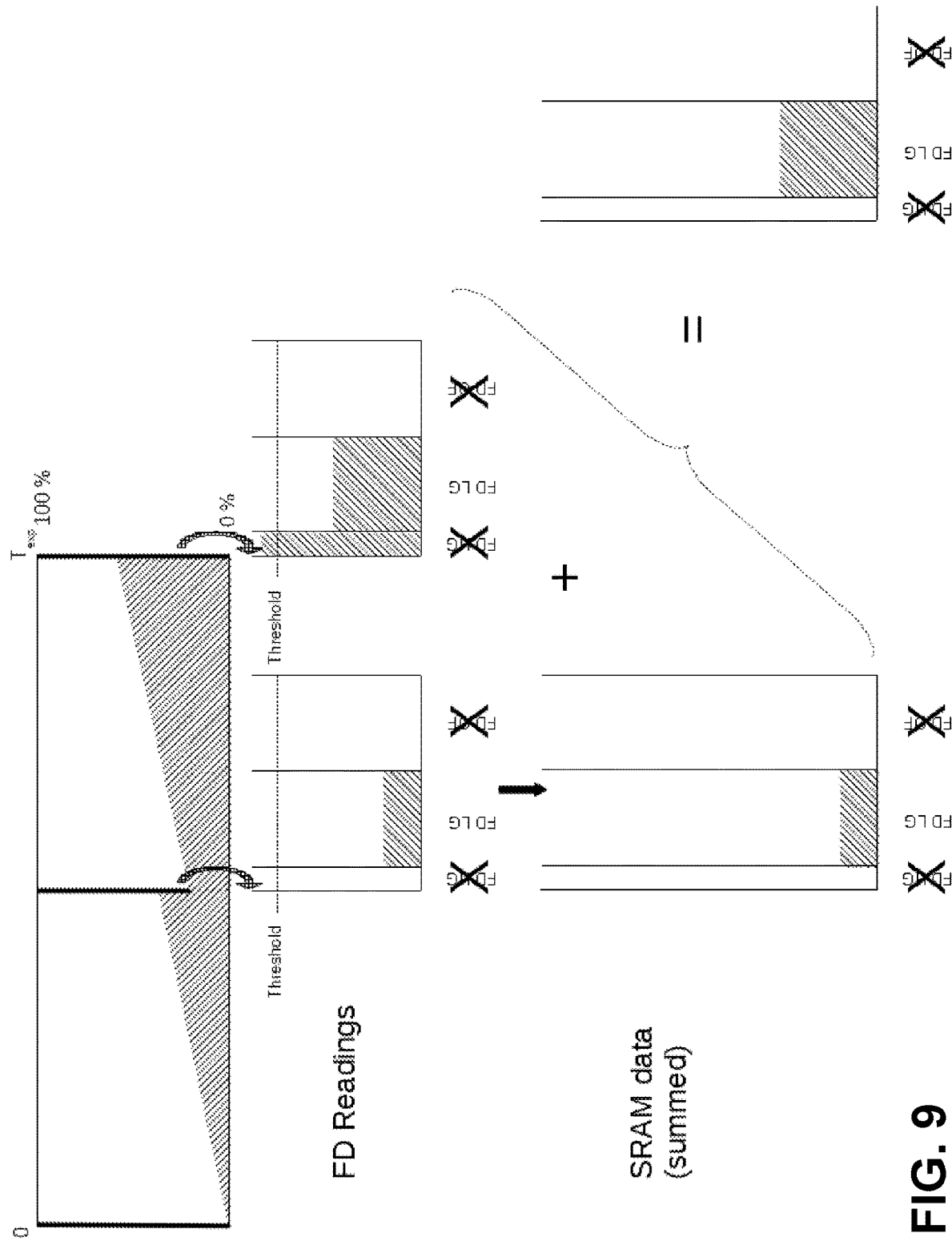
Figure 10:
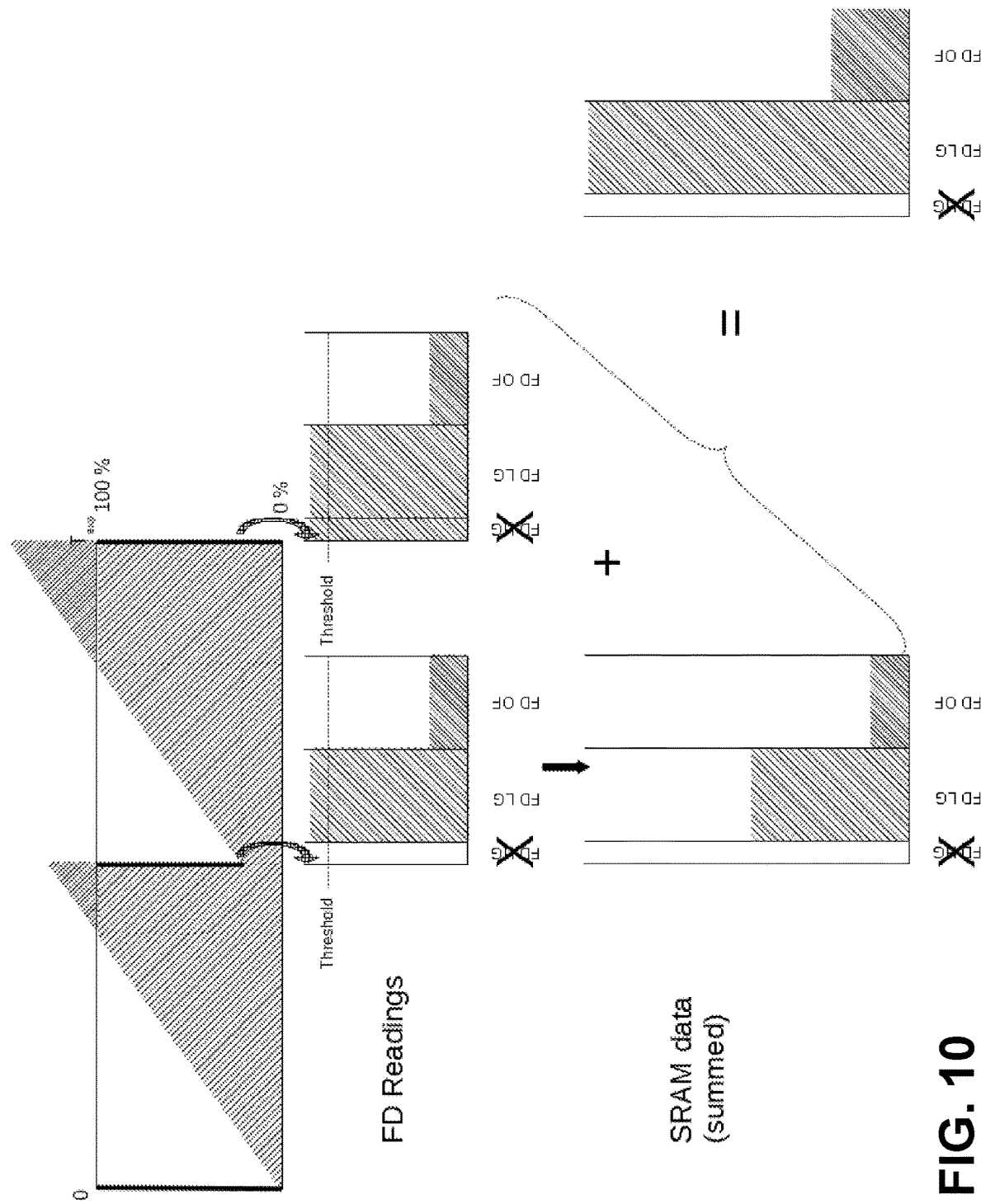

FIG. 8 to FIG. 10 illustrate the inventive method for three different illumination conditions: low-light, high-light and oversaturating condition. For each of the three illumination conditions, the image sensor is operated accordingly to generate HDR image frames from multiple subframe exposures. For the purpose of illustration, only two subframe exposures of approximately equal exposure duration are assumed, but embodiments of the invention can use more than two subframe exposures. Likewise, the end of the first subframe exposure being programmed (through the rolling shutter sequences) to happen at or near the mid-point of the composite full frame exposure time (i.e., the sum of all subframe exposure times) is not essential to the invention.

For instance, the ratio of a first and a second subframe exposure time can very well be 1:9, even for subframe exposures that are not contiguous in time. It is also noted that the (composite) full frame exposure time 'Texp' can be smaller than the full frame period, depending on the exposure settings of the image sensor. As shown in the preceding figures, a delayed reset signal can erase the photocharge in the photoelectric element at the start of the first subframe exposure, which can be delayed with respect of the start of the corresponding full frame time interval.

Reference is now made to the low-light illumination conditions in FIG. 8. After an initial reset of the pixel photoelectric element (first vertical solid line at 0% of the frame exposure time Texp), the photocharge does not built up quickly enough to be affected by the partial transfer pulse applied at mid-exposure (second vertical solid line at about 50% of Texp) to the pixel transfer gate. As a result, none of the generated photocharge is transferred to the first and connected second charge accumulation element (e.g., floating diffusion node and additional gain capacitance) when the pixel is switched into the low gain configuration during readout. The high gain channel is not used for the first subframe. After correlated double sampling—that is subtracting the pixel reset level from the pixel signal level prior to A/D conversion—the converted pixel data delivered at the output of the A/D conversion unit is therefore zero. This value is unconditionally written to the pixel memory, without any further processing by the PML.

At the end of the second subframe exposure, the reset levels of for the low gain and high gain setting of the pixel are read out. This is followed by a readout of the signal level in the high gain configuration after a complete transfer of the photocharge from the photoelectric element to the first charge accumulation element of the charge-voltage-converter has been performed (third vertical solid line at 100% of Texp). Then the conversion gain of the pixel is switched to the low gain channel and the signal level for the same photocharge, this time present on the first and second charge accumulation element, is determined. Correlated double sampling is applied both for the high gain channel and the low gain channel, to cancel the kTC noise of the respective gain channel, and the A/D conversion unit converts the reset noise-corrected signal levels (pixel data) for the high gain and the low gain into the digital domain. It is noted that all these readings happen in the same unit time slot and are performed in the following order: reset level for low gain, reset level for high gain, signal level for high gain, signal level for low gain.

Next, the PML compares the pixel data relative to the high gain setting to a threshold value for the high gain, THG. If the pixel data is lower than the THG threshold, which is indeed the case for the low-light illumination condition depicted in FIG. 8, the high gain pixel data is stored in the pixel memory and replaces the data currently stored therein. If, however the high gain pixel data had exceeded the high gain threshold value THG, then the high gain pixel data would have been discarded and only the low gain data would have been taken into account. It follows that for the low-light illumination conditions referred to in FIG. 8 only the high gain pixel data is retained and stored as the final data to be output by the image sensor chip.

In alternative embodiments of the invention, instead of discarding the high gain pixel data obtained for the last subframe if the second threshold value THG is exceeded, it is possible to combine the high gain pixel data with the low gain data into a single output word. For instance, a 13 bit wide data word for the low gain may be combined with a 14 bit wide data word for the high gain to obtain a single compressed output word, e.g., 16 bit wide. A level-dependent compression algorithm may internally amplify the low gain signals to approximately match the high conversion gain. For very low illumination, only the high gain data is included in the compressed output word, whereas for very high illumination only the low gain data is included. In the intermediate region, e.g. the transition between very low and very high illumination, the number of bits of the high data that is retained in the compressed output data word is reduced step by step, while the number of significant bits of the low gain data in the output word is progressively increased. Moreover, inevitable pixel-to-pixel and sensor-to-sensor variations in the ratio between the high conversion gain and the low conversion gain, leading to differences between the high gain sample and the low gain sample for each pixel, can be taken into account by replacing shot noise dominated bits in the high gain data word by this difference information.

The generation of compressed output words has the benefit that the total I/O bandwidth can be reduced (i.e. minimizing the amount of data to be sent off-chip), while the respective low gain and high gain image data is still available with regard to an enlarged range of illumination levels. It is also advantageous for a smooth signal transition from high gain image data to low gain image data in the externally (e.g. off-chip) reconstructed image frame (e.g. applying a corresponding decompression operation to the compressed output word).

The threshold level THG can be relatively low compared to the full well capacity associated with the first charge accumulation element. As little as a few tens or a few hundreds of electrons may be left in the photoelectric element after a partial transfer for the noise on the pixel's signal level to be dominated by the shot noise limit, which justifies the readout in the low gain configuration of the pixel for stronger signal levels, but encourages the readout in the high gain configuration of the pixel for weaker signal levels at the end of the final subframe exposure. The threshold value THG may be provided externally by the user, programed into the image sensor device by the user, or set to a default value and determines when to use the high gain pixel data or the low gain pixel data as the output. It generally reflects the measured or expected amount of shot noise, and possibly noise contributions form variations in the transfer pulse amplitude, above which applying a high readout gain does not lead to a significantly more advantageous signal-to-noise ratio as compared to the low readout gain. Finding a good value for the amplitude of the partial transfer pulses is typically the result of balancing two conflicting requirements: on the one hand, the integrated photocharge remaining in the photosensitive element after all partial transfers is preferably sufficiently large so as to be dominated by the intrinsic shot noise when the readout channel is switched to the low gain, but on the other hand, not too much of the integrated photocharge should remain in the photosensitive element after each non-final subframe exposure, in order to not overly limit the pixel's FWC during the following subframe exposure.

Still with reference to the low-light illumination conditions depicted in FIG. 8, an alternative way of providing pixel data at the image sensor output may comprise sending one full image frame of pixel data pertaining to the high gain readout channel and, independently, sending another one full image frame of pixel data pertaining to the low gain readout channel. The two image frames (high gain and low gain) may be combined off-chip, e.g. in an image blending unit (HDR synthesizer) of a camera comprising the image sensor or in another device. This provides the user with more flexibility when combining the low gain image and the high gain image into a single HDR image. In this alternative output format, the high gain pixel data is sent to the sensor's I/O circuitry directly and, therefore, is not stored in the pixel memory. The low gain pixel data currently stored in the pixel memory (preceding subframe exposure) is not replaced and is available for further processing thereof, e.g. for combination with the low gain pixel data of current (last) subframe exposure.

Turning now to the bright-light illumination conditions under consideration in FIG. 9, one notices that the photocharge generated up to mid-exposure, i.e. the end of the first subframe exposure, is affected by the partial transfer pulse that is delivered to the pixel transfer gate. As a result, after having read out the reset level relative to the first and second charge accumulation element when the pixel is configured to have a low conversion gain, a portion of the so far generated photocharge is transferred to the charge accumulation elements and the induced signal voltage is read out. Again, correlated double sampling is applied and the reset noise-corrected signal level is converted by the A/D conversion unit. The obtained digital value of the low gain pixel data is written to the pixel memory.

At the end of the second subframe exposure, the complete transfer of the photocharge remaining in the photoelectric element is effected and the reset and signal levels of the pixel are read out as for the low-light conditions referred to in FIG. 8. Furthermore, correlated double sampling is applied to obtain the high gain and low gain pixel data after A/D conversion. In the case of bright-light illumination conditions depicted in FIG. 9, upon comparison of the high gain pixel data with the high gain threshold value THG by the PML, the THG threshold value is exceeded, which leads to the decision to discard the high gain pixel data. Therefore, only the low gain pixel data is taken into account by the PML. More specifically, the PML fetches the low gain pixel data relating to the preceding, first subframe from the pixel memory, adds the fetched, previous low gain pixel data and the currently supplied low gain pixel data, and writes the result of the addition back to the pixel memory.

In embodiments of the invention, the threshold value for the high gain channel, THG, and the threshold value for the low gain channel, TLG, preferably are programmable values that can be changed by the user or are determined as a function of the number of subframes in each full frame, the pulse amplitude of the partial charge transfer pulses applied to the transfer gates, and the ratios between the individual subframe exposure times.

In exemplary embodiments of the invention, the pixels' FWC associated with the high gain channel may be about 10 ke– and the FWC associated with the low gain channel may be about 40 ke~. Partial transfer pulses (TX) may be selected to leave a photocharge between 500 e– and 1000 e– in each of the pixels' photodiodes.

Having regard to oversaturating illumination conditions, FIG. 10 illustrates that the generated photocharge exceeds the well capacity (upper horizontal line) associated with the photoelectric element, e.g. the PPD, which causes the photocharge in excess to spills from the photoelectric element into the charge well associated with at least the first charge accumulation element of the pixel's buffered charge-voltage converter, e.g. connected first and second charge accumulation element. The presence of an overflow charge on the first charge accumulation element, or on the interconnected first and second charge accumulation element, may be detected for each pixel prior to the delivery of the reset pulse at the end of each subframe exposure. Hence, an oversaturation regime for one or more pixels of the image sensor can be detected. For the illumination conditions referred to in FIG. 10, only the pixel row data (reset-noise corrected) relating to the low conversion gain setting of the pixel is used in all the subframe exposures, because the complete photocharge transfer from the saturated photoelectric element to the first charge accumulation element always causes the THG value to be exceeded. In consequence, only the pixel data relating to low conversion gain configuration of the pixel is added by the PML for all the subframe exposures comprised by the full image frame, and the resulting partial or final sum is optionally compressed, before the intermediate or final data value is written into the pixel memory.

Optionally, in the method described above, the overflow level of the photocharge receiving charge accumulation element(s) is determined after each subframe exposure prior to the delivery of the reset pulse marking the start of sampling a new signal and/or reset level. Additional, unoccupied and/or pixel memory locations marked as invalid for external readout may store the determined pixel overflow level in addition to the pixel signal level and/or pixel reset level. The so obtained and stored overflow level for each pixel may be processed by the PML too. For instance, the PML may fetch the cumulative overflow level relating to preceding subframe exposures from the pixel memory and add it to the overflow determined in respect of the current subframe exposure, e.g., a further intermediate subframe exposure or the final subframe exposure in an image frame. The cumulative overflow level after the final subframe exposure may then be added to the final low gain pixel data (e.g., cumulative sum of low gain pixel data over all the subframe exposures in the image frame). Alternatively, in the event that an overflow of photocharge is detected, the photoelectric element and the charge accumulation elements may simply be reset without processing and/or storing the specific overflow level. The detection of photocharge overflow events may still be useful to inform the user, or internal components of the image sensor, that an image frame was acquired under overexposure conditions.

Although embodiments of the invention preferably implement correlated double sampling to reduce reset noise, the inventive method does not rely on correlated double sampling and signal level may be sampled directly, without sampling a preceding reset level. In case that the overflow level of a pixel is also determined as described above, digital double sampling may be implemented to correct the overflow level for the residual reset noise present on the charge accumulation element(s) after the initial or each subsequent reset of the pixel in each image frame.

Furthermore, more than two subframe exposures may take place during a full frame interval of the image sensor. For instance, at least three subframe exposures may occur during the full frame interval, of which the first two consecutive subframe exposures are situated in the mid-portion relative to the cumulative exposure time across all subframes in one full frame. In such embodiments, the partial exposure time allocated to the second subframe exposure may be so short as to allow the capturing of very bright signals by the image sensor. In the exemplary embodiments described above, if the PPD as photoelectric element can store 40 ke– (full well capacity—FWC), then the FWC can be effectively increased to approximately 80 ke– (ignoring determining the overflow level, otherwise it would be approximately 160 ke~) over the duration of the cumulative (i.e. total or full) exposure time of the image frame consisting of two substantially equal subframe exposures, provided that only a very small percentage of the integrated photocharge remains in the PPD after the partial transfer. Under very bright illumination conditions even the extended FWC of about 80 ke– is insufficient to prevent the pixel output from saturating. In contrast thereto, if the second out of the three or more subframe exposures is chosen short relative to the full exposure time, e.g. about one eight of the full exposure time of the image frame, then the pixel photocharge that can be collected during this relatively short, second subframe exposure will be larger than about 80/8=10 ke– and have an associated SNR of more than 40 dB, assuming similar bright illumination conditions as in the previous case of a double-exposure (i.e. beyond saturation level). As the FWC is not reached the short, second subframe exposure, it is possible to extend the DR of the image sensor even further by selecting the pixel data originating from the short subframe exposure as the only pixel data relevant for the output. More specifically, the critical level for the photocharge integrated during the first subframe exposure, e.g., about 80*7/8/2=35 ke– in the present example, defines the low-gain threshold level TLG for the digitized pixel data above which saturation conditions are detected in respect of the first or last subframe exposure. Accordingly, the pixel data pertaining to the shortest subframe exposure period (i.e., the second in this case) is selected as the relevant output data if the low-gain threshold level TLG is exceeded. The ratio of subframe exposure periods can be accurately calculated in all embodiments of the invention and the acquired pixel data can thus be linearized. Embodiments of the invention in which a short intermediate subframe exposure is provided benefit from even higher DR values (e.g., short exposure of about one eight of full exposure time adds approximately 18 dB of DR)

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An image sensor provided as an integrated circuit, the image sensor comprising a first substrate, a second substrate, vertically stacked and electrically interconnected with the first substrate, and a pixel array disposed within the first substrate, the pixel array comprising a plurality of pixels logically organized in pixel rows and pixel columns, wherein the pixel array is organized into a plurality of pixel subarrays and each pixel of the pixel array comprises:
- a photoelectric element for integrating a photocharge while exposed to light during each one of a plurality of subframe exposures comprised in a frame interval;
- a transfer gate for transferring at least a fraction of the integrated photocharge present in the photoelectric element at the end of each subframe exposure to a buffered charge-voltage converter;
- the buffered charge-voltage converter for receiving and converting the transferred photocharge to a signal voltage, the buffered charge-voltage converter comprising a first charge accumulation element operatively connectable to at least one second charge accumulation element through a gain switch, to switch a conversion gain of the pixel between a high conversion gain and a low conversion gain, said at least one second charge accumulation element being provided in the first substrate or in the second substrate;
- control circuitry adapted to trigger a partial or a complete transfer of said integrated photocharge in the photoelectric elements of each pixel row, by adjusting the amplitude of a transfer pulse applied to the transfer gate; and
- readout circuitry arranged on the second substrate, said readout circuitry comprising a plurality of parallelly operable readout block, each readout block being associated with a respective one of the plurality of pixel subarrays and configured to sequentially read out pixel row data of the respective pixel subarray at the end of each subframe exposure;
- wherein the control circuitry, in at least one operating mode of the image sensor, is configured to:
- trigger the partial transfer for all but the last one of the plurality of subframe exposures and the complete transfer for the last one of the plurality of subframe exposures,
- time-interleave at least two rolling shutter control sequences associated with at least two time-overlapping subframes exposures of the plurality of subframe exposures in respect of each pixel subarray, and
- control the gain switches (202-3) in each pixel row to operate the pixels at the low conversion gain for all but the last one of the plurality of subframe exposures and, for the last one of the plurality of subframe exposures, first operate the pixels at the high conversion gain and subsequently at the low conversion gain, and
- wherein each readout block of the readout circuitry comprises, in a pipelined architecture:
- an A/D conversion unit for sampling and digitizing pixel row data of the corresponding pixel subarray,
- pixel memory logic conditionally combining digitized pixel row data with previously digitized pixel row data buffered in a pixel memory unit, and
- the pixel memory unit for buffering digitized pixel row data output by the pixel memory logic.

2. The image sensor according to claim 1, wherein the pixel memory logic of each readout block is configured to combine digitized pixel row data with previously digitized pixel row data buffered in the pixel memory unit if the previously digitized pixel row data relates to an earlier subframe exposure within the same frame interval and
- if the digitized pixel row data pertaining to the low conversion gain in one of the intermediate subframes is lower than a first threshold level, or else
- if the digitized pixel row data pertaining to the low conversion gain in the last subframe is larger than the first threshold level, while the corresponding digitized pixel row data pertaining to the high conversion gain in the last subframe exceeds a second threshold level.

3. The image sensor according to claim 1, wherein the pixel memory units of the readout blocks are provided as SRAM banks.

4. The image sensor according to claim 1, wherein an aggregate size of the pixel memory units of the readout blocks only permits to store a portion of a full frame acquired with the pixel array.

5. The image sensor according to claim 1, wherein the pixel memory logic is further configured to process digitized pixel row data, said processing of digitized pixel row data by the pixel memory logic comprising converting Gray-coded digital pixel row data into binary-coded digital pixel row data and/or scaling digital pixel row data by a scaling factor.

6. The image sensor according to claim 1, wherein said conditionally combining digitized pixel row data with digitized pixel row data stored in the pixel memory unit comprises adding currently obtained digital pixel row data to, or subtracting from, previously obtained digital pixel row data stored in the pixel memory unit.

7. The image sensor according to claim 1, wherein the pipeline architecture of the readout blocks is configured to input and output pixel row data at a row-per-row level, at a pixel group-per-pixel group level, or at a pixel-per-pixel level.

8. The image sensor according to claim 1, wherein the control circuitry is configured to select pixel rows of each pixel subarray for readout, prior to triggering a partial or complete transfer of the integrated photocharges, whereby each readout block is enabled to detect and read out an overflow photocharge in excess of a full well capacity associated with each photoelectric element.

9. The image sensor according claim 1, wherein the control circuitry is configured to reset the charge accumulation elements of the charge-voltage converters in a pixel row, prior to triggering a partial or complete transfer of integrated photocharges, whereby each readout block is enabled to detect a reset voltage for the pixels of that pixel row and apply correlated double sampling in respect of a signal voltage for the pixels of that pixel row, wherein a signal voltage is representative of a partially or a completely transferred photocharge.

10. The image sensor according to claim 1, wherein the pixel memory logic of each readout block is configured to combine and compress the digital pixel row data pertaining to the high conversion gain and the low conversion gain into a single row of output data.

11. The image sensor according to claim 1, wherein the subframe exposures are continuous within the frame interval, and/or wherein the subframe exposures are centred relative to the frame interval.

12. The image sensor according to claim 1, wherein the plurality of subframe exposures are of substantially equal duration.

13. The image sensor according to claim 1, wherein a total frame exposure period, being the sum of all subframe exposure periods, is programmable by adjusting the exposure period of one or more subframes.

14. The image sensor according to claim 1, wherein the control circuitry comprises multiple row drivers for driving the pixel rows of each subarray, said multiple row drivers being configured to drive different subsets of pixels in each row.

15. A method of operating an integrated circuit image sensor comprising a pixel array, pixels of the pixel array being logically organized in pixel rows and pixel columns, and the pixel array being organized into a plurality of pixel subarrays, the method comprising:
integrating a photocharge in the pixels of the pixel array during each one of a plurality of subframe exposures comprised in a frame interval,
partially transferring the integrated photocharges of the pixels to respective charge-voltage converters of the pixels at the end of all but the last one of the plurality of subframe exposures, wherein the charge-voltage converters are configured to apply a low conversion gain when reading out the partially transferred photocharges,
completely transferring the integrated photocharges of the pixels to the respective charge-voltage converters of the pixels at the end of the last one of the plurality of subframe exposures, wherein the charge-voltage converters are configured to apply a high conversion gain and subsequently a low conversion gain when reading out the completely transferred photocharges,
sequentially reading out pixel row data of each subarray at the end of each subframe exposure, said sequentially reading out of the pixel row data further including the pipelined steps of sampling and digitizing said pixel row data, conditionally combining digitized pixel row data with previously digitized pixel row data buffered in a pixel memory unit of the readout block, and buffering digitized pixel row data in the pixel memory unit of the readout block, wherein pixel row data stemming from different pixel subarrays is being read out in parallel, and
wherein for each pixel subarray, at least two subframes exposures of the plurality of subframe exposures are overlapping in time and rolling shutter control sequences associated with said at least two subframes exposures are being time-interleaved.

16. The method according to claim 15, wherein said conditionally combining digitized pixel row data with previously digitized pixel row data buffered in the pixel memory unit comprises
comparing the low conversion gain readout of the digitized pixel row data to a first threshold level if the previously digitized pixel row data relates to an earlier subframe exposure within the same frame interval, and
if the low conversion gain readout of the digitized pixel row data of the last subframe is below the first threshold level, comparing the corresponding high conversion gain readout of the digitized pixel row data to a second threshold level.

* * * * *